United States Patent
Balakrishnan et al.

(10) Patent No.: US 12,505,648 B1
(45) Date of Patent: *Dec. 23, 2025

(54) MULTIMODAL AI MODEL PROTECTION USING EMBEDDINGS

(71) Applicant: HiddenLayer, Inc., Austin, TX (US)

(72) Inventors: Ravikumar Balakrishnan, Beaverton, OR (US); Jason Martin, Beaverton, OR (US); Andrew Davis, Portland, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/261,899

(22) Filed: Jul. 7, 2025

(51) Int. Cl.
*G06V 10/74* (2022.01)
*G06V 10/774* (2022.01)
*G06V 10/94* (2022.01)

(52) U.S. Cl.
CPC ........ *G06V 10/761* (2022.01); *G06V 10/7747* (2022.01); *G06V 10/95* (2022.01)

(58) Field of Classification Search
CPC ... G06V 10/761; G06V 10/7747; G06V 10/95
See application file for complete search history.

(56) References Cited

U.S. PATENT DOCUMENTS

| | | |
|---|---|---|
| 7,802,298 B1 | 9/2010 | Hong et al. |
| 9,356,941 B1 | 5/2016 | Kislyuk et al. |
| 9,516,053 B1 | 12/2016 | Muddu et al. |
| 10,121,104 B1 | 11/2018 | Hu et al. |
| 10,193,902 B1 | 1/2019 | Caspi et al. |
| 10,210,036 B2 | 2/2019 | Iyer et al. |
| 10,462,168 B2 | 10/2019 | Shibahara et al. |
| 10,637,884 B2 | 4/2020 | Apple et al. |
| 10,673,880 B1 | 6/2020 | Pratt et al. |
| 10,764,313 B1 | 9/2020 | Mushtaq |

(Continued)

FOREIGN PATENT DOCUMENTS

CN 117786750 A 3/2024

OTHER PUBLICATIONS

Abadi et al., 2016, "Deep Learning with Differential Privacy," arXiv:1607.00133v2 [stat.ML] Oct. 24, 2016 (14 pages).

(Continued)

*Primary Examiner* — Amara Abdi
(74) *Attorney, Agent, or Firm* — Jones Day

(57) ABSTRACT

Techniques for assessing multi-modal inputs to a machine learning model involve receiving a multimodal input containing an image, producing several transformed versions of that image, and generating embeddings for both the original and transformed images. A pairwise similarity analysis among all embeddings is conducted to determine distance values. Two dissimilarity metrics can then be calculated: one reflecting the differences among the transformed images, and another comparing the original image to its transformed versions. If the dissimilarity among the transformed images is greater than that between the original and transformed images plus a threshold, the system triggers a remediation action. This action either blocks the input from being processed by the machine learning model or prevents the model's output from being returned to the requester, thereby enhancing the reliability and security of the model.

30 Claims, 18 Drawing Sheets

(56) References Cited

U.S. PATENT DOCUMENTS

| | | | |
|---|---|---|---|
| 10,803,188 | B1 | 10/2020 | Rajput et al. |
| 10,824,721 | B2 | 11/2020 | Kesarwani et al. |
| 11,310,270 | B1 | 4/2022 | Weber et al. |
| 11,483,327 | B2 | 10/2022 | Hen et al. |
| 11,501,101 | B1 | 11/2022 | Ganesan et al. |
| 11,551,137 | B1 | 1/2023 | Echauz et al. |
| 11,601,468 | B2 | 3/2023 | Angel et al. |
| 11,710,045 | B2 | 7/2023 | Lee et al. |
| 11,710,067 | B2 | 7/2023 | Harris et al. |
| 11,762,998 | B2 | 9/2023 | Kuta et al. |
| 11,777,957 | B2 | 10/2023 | Chen et al. |
| 11,875,130 | B1 | 1/2024 | Bosnjakovic et al. |
| 11,893,111 | B2 | 2/2024 | Sai et al. |
| 11,893,358 | B1 | 2/2024 | Lakshmikanthan et al. |
| 11,930,030 | B1 | 3/2024 | Burns et al. |
| 11,930,039 | B1 | 3/2024 | Geethakumar et al. |
| 11,954,199 | B1 | 4/2024 | Burns et al. |
| 11,960,514 | B1 | 4/2024 | Taylert et al. |
| 11,962,546 | B1 | 4/2024 | Hattangady et al. |
| 11,971,914 | B1 | 4/2024 | Watson et al. |
| 11,972,333 | B1 | 4/2024 | Horesh et al. |
| 11,995,180 | B1* | 5/2024 | Cappel .................... G06F 21/55 |
| 11,997,059 | B1 | 5/2024 | Su et al. |
| 12,026,255 | B1* | 7/2024 | Burns .................... G06F 21/554 |
| 12,105,844 | B1 | 10/2024 | Burns et al. |
| 12,107,885 | B1 | 10/2024 | Kawasaki et al. |
| 12,111,926 | B1 | 10/2024 | Beveridge et al. |
| 12,124,592 | B1 | 10/2024 | O'Hern et al. |
| 12,130,917 | B1 | 10/2024 | Yeung et al. |
| 12,130,943 | B1 | 10/2024 | Burns et al. |
| 12,137,118 | B1 | 11/2024 | Kawasaki et al. |
| 12,160,409 | B2* | 12/2024 | Kuta ....................... G06N 3/082 |
| 12,174,954 | B1 | 12/2024 | Yeung et al. |
| 12,182,264 | B2 | 12/2024 | Sinha et al. |
| 12,197,859 | B1 | 1/2025 | Malviya et al. |
| 12,204,323 | B1 | 1/2025 | Malviya et al. |
| 12,229,265 | B1 | 2/2025 | Yeung et al. |
| 12,248,883 | B1 | 3/2025 | Rideout et al. |
| 12,293,277 | B1 | 5/2025 | Yeung et al. |
| 12,314,380 | B2 | 5/2025 | Burns et al. |
| 12,328,331 | B1 | 6/2025 | Jia et al. |
| 2021/0157912 | A1* | 5/2021 | Kruthiveti Subrahmanyeswara Sai .............. G06N 20/00 |
| 2022/0343026 | A1* | 10/2022 | Yang ....................... G06N 3/094 |
| 2024/0320952 | A1* | 9/2024 | Petitpont ................ G06V 10/82 |
| 2025/0005201 | A1* | 1/2025 | Qiao ........................ G06F 21/32 |

OTHER PUBLICATIONS

Carlini et al., 2021, "Extracting Training Data from Large Language Models," arXiv:2012.07805v2 [cs.CR] Jun. 15, 2021 (19 pages).

Chao et al., 2023, "Jailbreaking black box large language models in twenty queries," University of Pennsylvania, Available online at: https://arxiv.org/abs/2211.09527 (21 pages).

Choquette-Choo et al., 2021, "Label-Only Membership Inference Attacks," arXiv:2007.14321v3 [cs.CR] Dec. 5, 2021 (17 pages).

Goodfellow et al., 2015, "Explaining and harnessing adversarial examples," 3rd International Conference on Learning Representations, ICLR 2015, Available online at: http://arxiv.org/abs/1412.6572 (11 pages).

Heusel et al., 2018, "GANs Trained by a Two Time-Scale Update Rule Converge to a Local Nash Equilibrium," arXiv:1706.08500v6 [cs.LG] Jan. 12, 2018 (38 pages).

Hu et al., 2021, "LoRA: Low-rank adaptation of large language models," arXiv:2106.09685v2 [cs.CL] Oct. 16, 2021 (26 pages).

Hu et al., 2022, "LoRA: Low-rank adaptation of large language models," International Conference on Learning Representations, Available online at: https://openreview.net/forum?id=nZeVKeeFYf9 (13 pages).

Imoxto, 2024, "prompt injection cleaned data set-v2," Hugging Face, available online at: https://huggingface.co/datasets/imoxto/prompt_injection_cleaned_datasetv2 (3 pages).

Jiang et al., 2023, "Mistral 7b," Available online at: https://mistral.ai/news/announcing-mistral-7b (9 pages).

Kahla et al., 2022, "Label-Only Model Inversion Attacks via Boundary Repulsion," arXiv:2203.01925v1 [cs.LG] Mar. 3, 2022 (13 pages).

Ke et al., 2017, "Lightgbm: a highly efficient gradient boosting decision tree," Proceedings of the 31st International Conference on Neural Information Processing Systems (9 pages).

Ko et al., 2023, "PrivMon: A Stream-Based System for Real-Time Privacy Attack Detection for Machine Learning Models," Raid 2023 https://doi.org/10.1145/3607199.3607232 (18 pages).

Lee et al., 2023, "Wizardvicunalm," Available online at: https://github.com/melodysdreamj/WizardVicunaLM (6 pages).

Lee, 2023, "ChatGPT DAN," ChatGPT DAN, Jailbreaks prompt, Available online at: https://github.com/0xk1h0/ChatGPT_DAN (3 pages).

Li et al., 2021, "Membership Leakage in Label-Only Exposures," arXiv:2007.155 28v3 [cs.LG] Sep. 17, 2021 (17 pages).

Li et al., 2022, "Blacklight: Scalable Defense for Neural Networks a ga inst Query-Based Black-Box Attacks," Proceedings of the 31st Usenix Security Symposium (19 pages).

Lian et al., 2023. "Openorca: An open datasetof gpt augmented flan rea soning traces," Hugging Face, Available online at: https://huggingface.co/Open-Orca/OpenOrca (8 pages).

Liu et al., 2015, "Deep Learning Face Attributes in the Wild," arXiv:1411.7766v3 [cs.CV] Sep. 24, 2015 (11 pages).

Luo et al., 2024, "Jailbreakv-28k: A benchmark for assessing the robustness of multimodal large language models against jailbreak attacks," Available online at: https://arxiv.org/abs/2404.03027 (20 pages).

MacDiarmid et al., 2024, "Simple probes can catch sleeper agents," Available online at: https://www.anthropic.com/news/probescatch-sleeper-agents (18 pages).

Madry et al., 2019, "Towards Deep Learning Models Resistant to Adversarial Attacks," arXiv:1706.06083v4 [stat.ML] Sep. 4, 2019 (28 pages).

Mattern et al., 2023, "Membership Inference Attacks against Language Models via Neighborhood Comparison," arXiv:2305.18462v2 [cs.CL] Aug. 7, 2023 (12 pages).

Mireshghallah et al., 2022, "Quantifying Privacy Risks of Masked Language Models Using Membership Inference Attacks," arXiv:2203.03929v2 [cs.LG] Nov. 4, 2022 (16 pages).

Perez et al., 2022, "Ignore previous prompt: Attack techniques for language models," NeurIPS ML Safety Workshop, 36th Conference on Neural Information Processing System (NeurIPS2022), Available online at: https://openreview.net/forum?id=qia Ro_7Zmug (21 pages).

Raman et al., 2023, "Model-tuning via prompts makes NLP models adversarially robust," The 2023 Conference on Empirical Methods in Natural Language Processing, Available online at: https://openreview.net/forum?id=R4yb4m7Nus (21 pages).

Salimans et al., 2016, "Improved Techniques for Training GANs," arXiv:1606.03498v1 [cs.LG] Jun. 10, 2016 (10 pages).

Schulhoff et al., 2023, "Ignore this title andhackAPrompt: Exposing systemic vulnerabilities of LLMs through a global prompthacking competition," The 2023 Conference on Empirical Methods in Natural Language Processing, Available online at: https://openreview.net/forum?id=hcDE6sOEfu (33 pages).

Sujet-Ai, 2024, "Sujetfinance dataset," Huging Face, https://huggingface.co/datasets/sujetai/Sujet-Finance-Instruct-177k (6 pages).

Templeton et al., 2024, "Scalingmonosemanticity : Extracting interpretable features from claude 3 sonnet," Transformer Circuits Thread, Available online at: https://transformer-circuits.pub/2024/scalingmonosemanticity/index.html (75 pages).

Touvron et al., 2023, "Llama 2: Open foundation and fine-tuned chat models," Available online at: https://arxiv.org/abs/2307.09288 (77 pages).

Zhang et al., 2020, "The Secret Revealer: Generative Model-Inversion Attacks Against Deep Neural Networks," https://arxiv.org/abs/1911.07135 (9 pages).

Zhang et al., 2024, "Tinyllama : An open-source small language model," Available online at: https://arxiv.org/abs/2401.02385 (10 pages).

(56) References Cited

OTHER PUBLICATIONS

Zheng et al., 2023, "Judging LLM-as-a-judge with MT-bench and chatbot arena," Thirty-seventh Conference on Neural Information Processing Systems Data sets and Benchmarks Track, Available online at: https://openreview.net/forum?id=uccHPGDlao (29 pages).
Zou et al., 2023, "Representation engineering: A top-down approach to ai transparency," Available online at: https://arxiv.org/abs/2310.01405 (55 pages).
Zou et al., 2023, "Universal and transferable adversarial attacks on aligned language models," Available online at: https://arxiv.org/abs/2307.15043 (31 pages).
Kim et al., 2023, "Robust Safety Classifier for Large Language Models: Adversarial Prompt Shield," Available online at: https://arxiv.org/abs/2311.00172 (11 pages).
Kim et al., 2023, "Memory-Efficient Fine-Tuning of Compressed Large Language Models via sub-4-bit Integer," Available online at https://arxiv.org/abs/2305.14152 (21 pages).
Zhou et al., 2024, "A Survey on Efficient Inference for Large Language Models," Available online at https://arxiv.org/abs/2404.14294 (36 pages).
International Search Report and Written Opinion mailed Jun. 25, 2025 for PCT/US2025/026109 filed Apr. 24, 2025 (11 pages).
Dinan et al., 2021, "Anticipating safety issues in e2e conversational ai: Framework and tooling," arXiv preprint arXiv:2107.03451v3 (43 pages).
Morozov et al., 2019, "Unsupervised Neural Quantization for Compressed-Domain Similarity Search," International Conference on Computer Vision (ICCV) 2019 (11 pages).
Rijthoven et al., 2021, "HookNet: Multi-resolution convulational neural networks for semantic segmentation in histopathology whole-slide images," Medical Imange Analysis 68:1-10 (10 pages).
Wang et al., 2023, "Self-Deception: Reverse Penetrating the Semantic Firewall of Large Language Models," arXiv:2308.11521v1 [cs.CL] Aug. 16, 2023 (15 pages).
Shayegani et al., 2023, "Survey of Vulnerabilities in Large Language Models Revealed by Adversarial Attacks," arXiv:2310.10844v1 [cs.CL] Oct. 16, 2023 (54 pages).
Bezymiannyi et al., 2023, "Filter for confidential information," Electronics and Control Systems 4(78):21-25 (5 pages).
Wang et al., 2023, "Self-Guard: Empower the LLM to Safeguard Itself," ACL Anthology, NAACL (21 pages).

* cited by examiner

MULTIMODAL AI MODEL PROTECTION USING EMBEDDINGS

TECHNICAL FIELD

The subject matter described herein relates to techniques for detecting adversarial attacks on machine learning models which leverage multimodal inputs.

BACKGROUND

Adversarial attacks on multimodal models exploit vulnerabilities across multiple data modalities, such as images, text, video, and audio, to deceive the model into making incorrect predictions or generating harmful outputs. Unlike traditional adversarial attacks that target a single modality—typically focusing on vision or text alone—multimodal attacks can manipulate cross-modal interactions, amplifying their potency. These attacks introduce challenges in detecting inconsistencies between modalities and require more complex defense strategies to ensure robust and safe AI systems.

SUMMARY

The current subject matter provides techniques for evaluating multi-modal inputs to machine learning models, with a particular focus on image-based and other modality-based data. The techniques are designed to assess the integrity and suitability of such inputs before they are ingested by the machine learning model, thereby enhancing the robustness and reliability of the model's operation.

In one aspect, the techniques involves receiving a multi-modal input, which includes at least an image, and generating multiple transformed versions of this image by applying various types of noise, such as Gaussian, impulse, shot, periodic, speckle, or quantization noise. For both the original image and each transformed version, embeddings can be generated—vector representations that capture the semantic content of the images. A pairwise similarity analysis is then performed among all generated embeddings, resulting in distance values for each pair. Based on these distance values, the method computes two dissimilarity metrics: a first metric reflecting the dissimilarity among the transformed versions (excluding the original image), and a second metric reflecting the dissimilarity between the original image and each transformed version.

If the first dissimilarity metric exceeds (optionally with a threshold) the second, the method initiates at least one remediation action. The remediation action can take varying forms including preventing the multi-modal input from being ingested by the machine learning model or blocking an output of the machine learning model responsive to ingesting the input. Conversely, if the difference between the two metrics meets or exceeds a defined threshold, the input is allowed to be ingested. The similarity analysis can utilize various mathematical approaches, including vector similarity, cosine similarity, Euclidean distance, Jaccard similarity, Manhattan distance, Minkowski distance, Cehebyshev distance, dot product, Mahalanobis distance, or Word Mover's distance. The dissimilarity metrics can be calculated as average or mean values for the respective groups of embeddings. Embeddings can be generated using either an image embedding model that is part of the machine learning model or an external model. In some cases, there are multiple embeddings made of the image and/or the transformed version of the image using different models (whether internal or external)

The multi-modal input can also include audio, video, or text in addition to the image. In some variations, the multimodal input includes two or more images and with such an arrangement, first and second dissimilarity metrics can be generated for each image. These dissimilarity metrics can be used to determine whether any remediation action is needed. Remediation can, for example, be applied to only the image(s) deemed to be adversarial or it can be applied to the input or output as a whole.

In another aspect, the techniques can be extended to multi-modal inputs comprising a first portion in one modality (such as image, audio, or video) and a second portion in a different modality. The same process of generating transformed versions, computing embeddings, performing similarity analysis, and determining dissimilarity metrics is applied to the first portion. Remediation actions are similarly triggered based on the relationship between the computed dissimilarity metrics.

The current subject matter also encompasses techniques that utilize activations—internal outputs of the machine learning model—instead of embeddings. With these techniques, after receiving a multi-modal input and generating transformed versions of the image, the model computes sets of activations for both the original and transformed images. Pairwise similarity analysis is performed among these activation sets, and dissimilarity metrics are computed as described above. Remediation actions can be initiated based on the comparison of these metrics, ensuring that only suitable inputs are ingested by the machine learning model. The activations can be computed using the primary machine learning model or an external model, and the methods are applicable to multi-modal inputs containing images, audio, video, or text.

Overall, these techniques provide a systematic approach for pre-screening multi-modal inputs to machine learning models, leveraging both embedding and activation-based analyses to detect anomalous or potentially harmful inputs and to trigger appropriate remediation actions. This arrangement is technically advantageous in that enhances the security, reliability, and performance of machine learning systems operating on diverse and potentially noisy data sources.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to techniques for detecting an adversarial attack on a multimodal machine learning model and/or a machine learning model architecture having multiple models corresponding to different modalities. Once these adversarial attacks are detected, various remediation actions can be initiated to prevent the machine learning model from behaving in an undesired manner. While the term machine learning model is used, the current subject matter is applicable to a wide array of artificial intelligence models.

Figure 1:
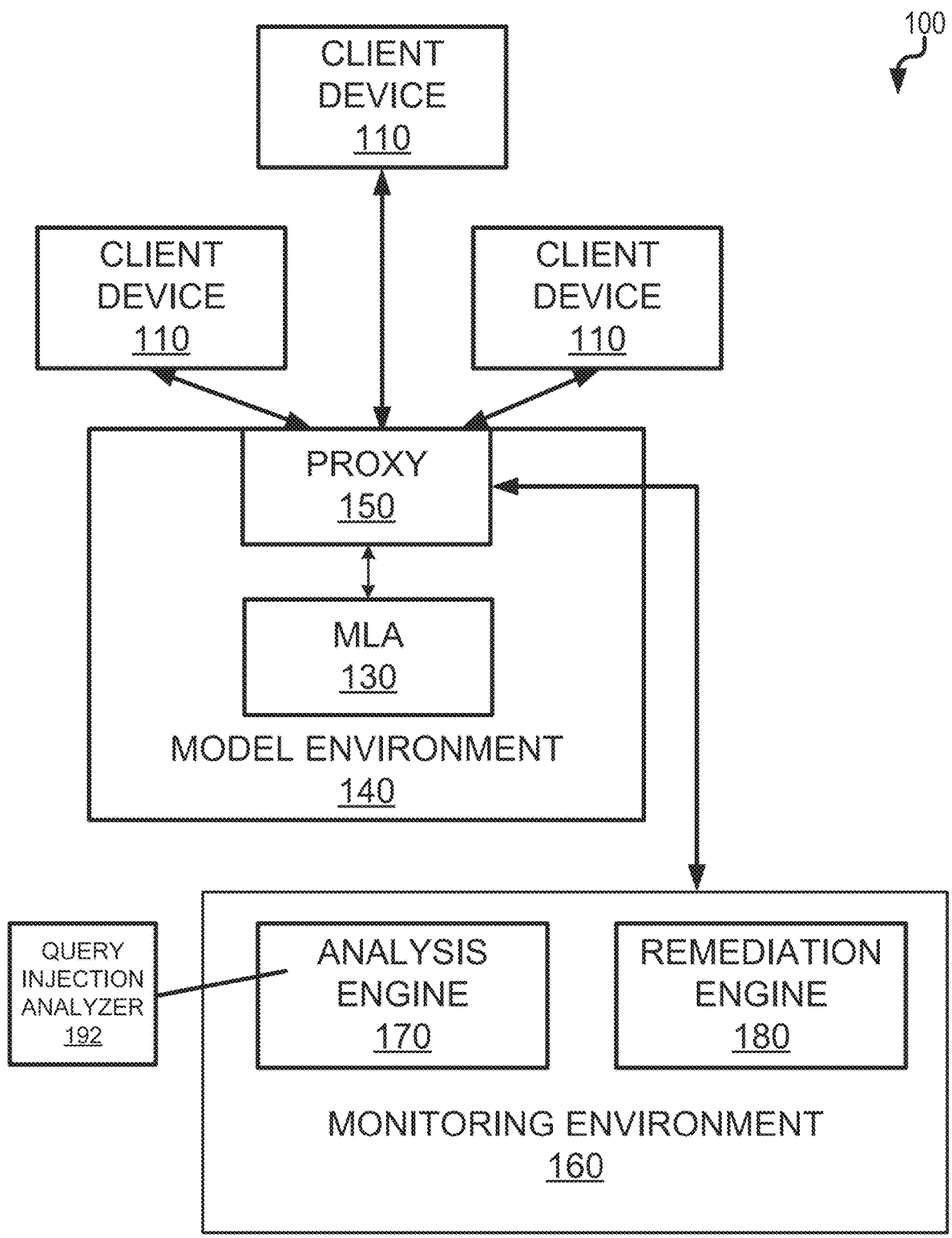
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. It will be appreciated that querying the MLA 130 can refer to querying one or more machine learning models which form part of the MLA 130. These queries can include or otherwise characterize various information including prompts ((e.g., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. In some cases, the MLA 130 is a multimodal model configured to accept input in two or more modalities such as text, audio, video, images, and the like. In some cases, the MLA 130 comprises an ensemble of models including one model having a first modality (e.g., text) and a second model having a second, different modality (e.g., image). Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130. The analysis engine 170 can execute a query injection analyzer 192 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
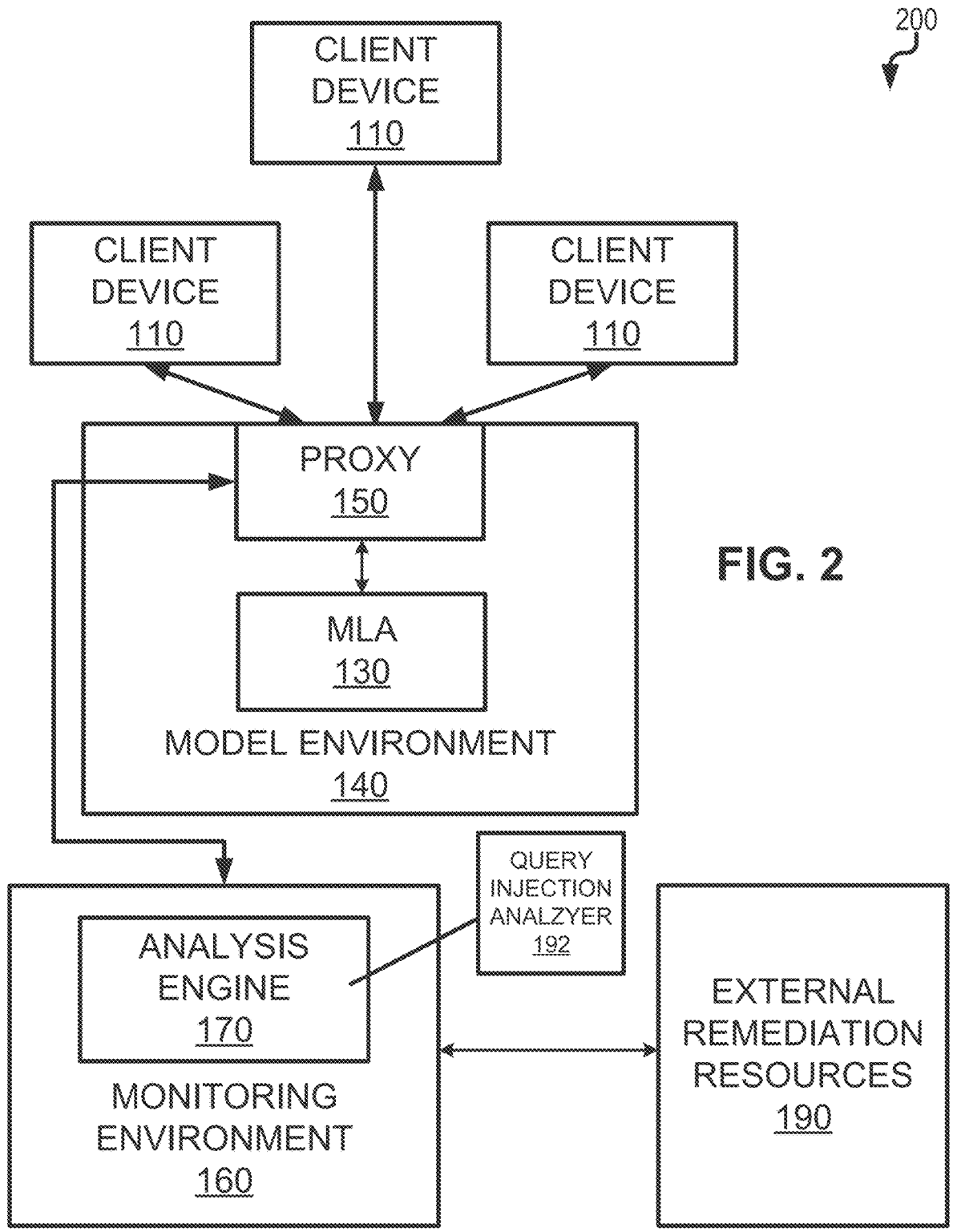
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
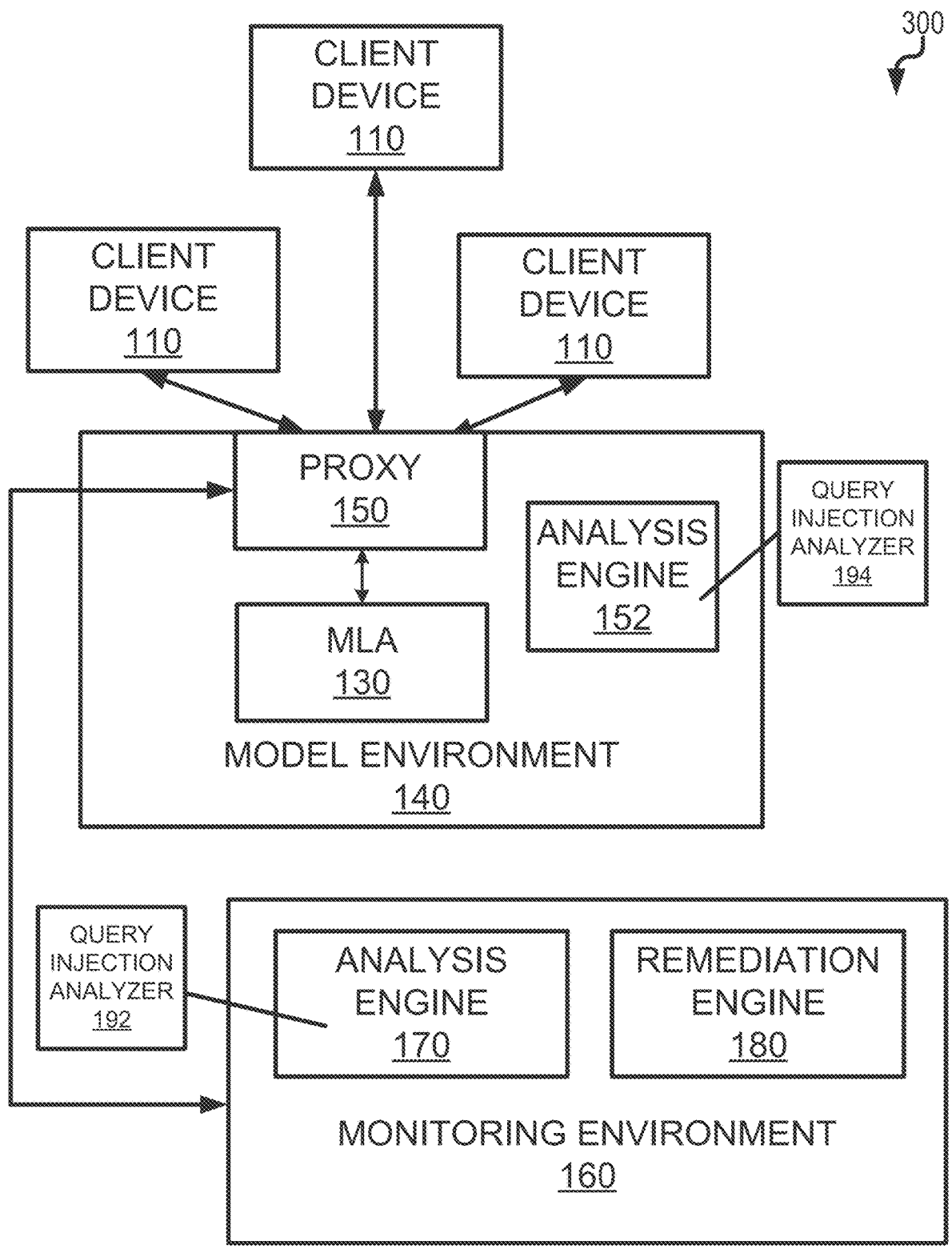
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170. The analysis engine 152 can execute a query injection analyzer 194 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The algorithms, detection logic and/or machine learning models forming part of the query injection analyzer 194 can, in some variations, be the same as those in the query injection analyzer 192. In other variations, the query injection analyzer 194 comprises or executes different algorithms, detection logic, and/or machine learning models than the query injection analyzer 192.

Figure 4:
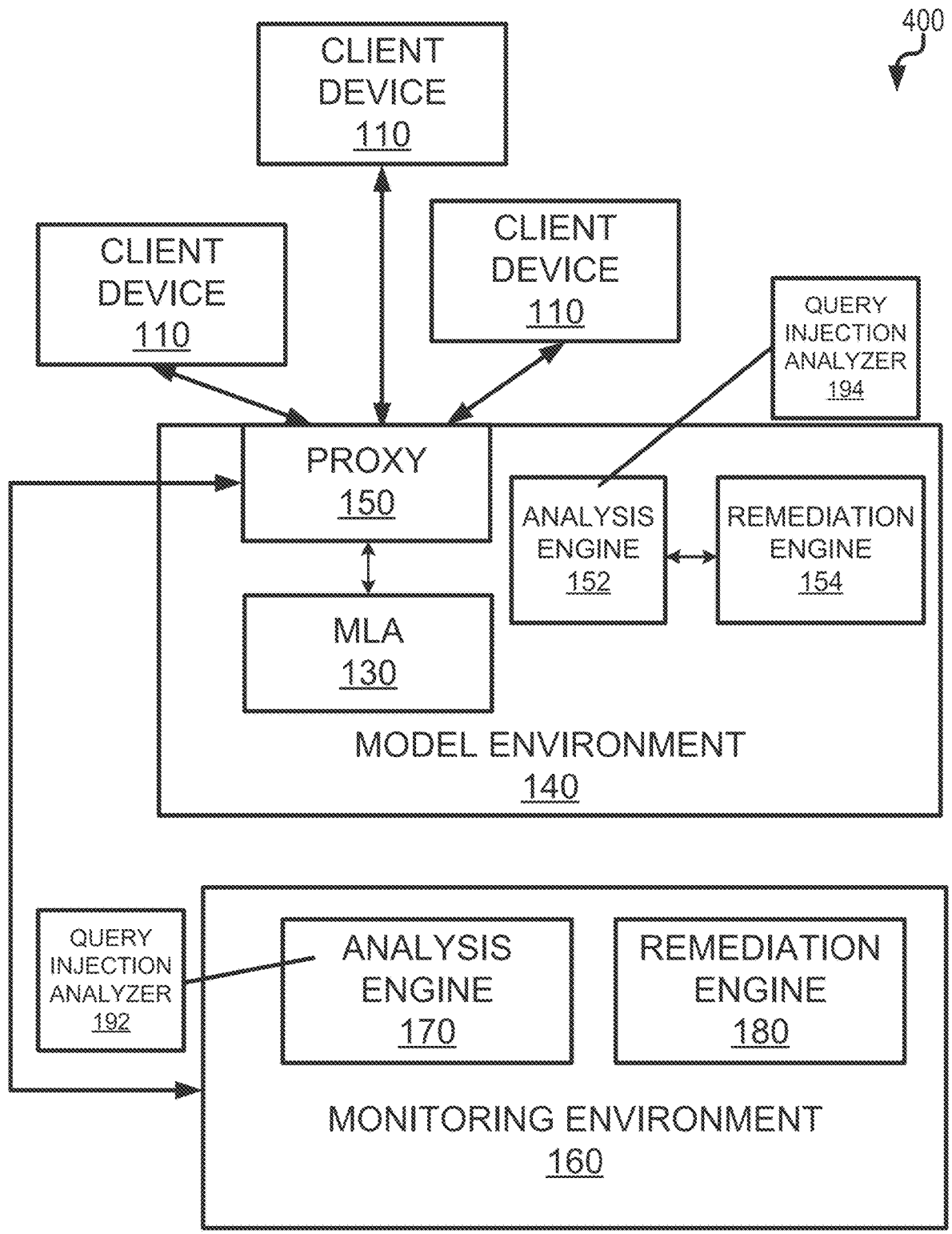
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
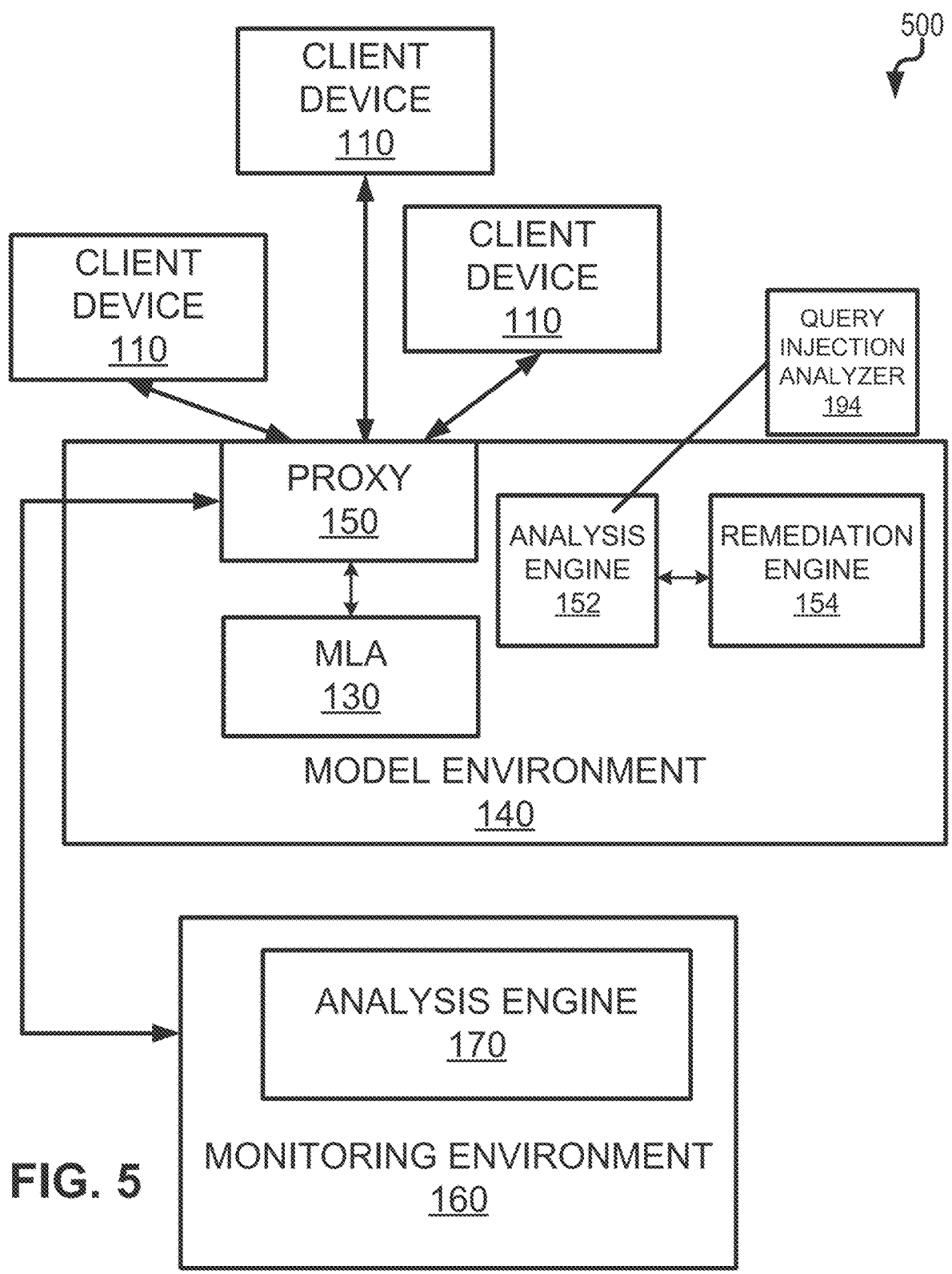
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
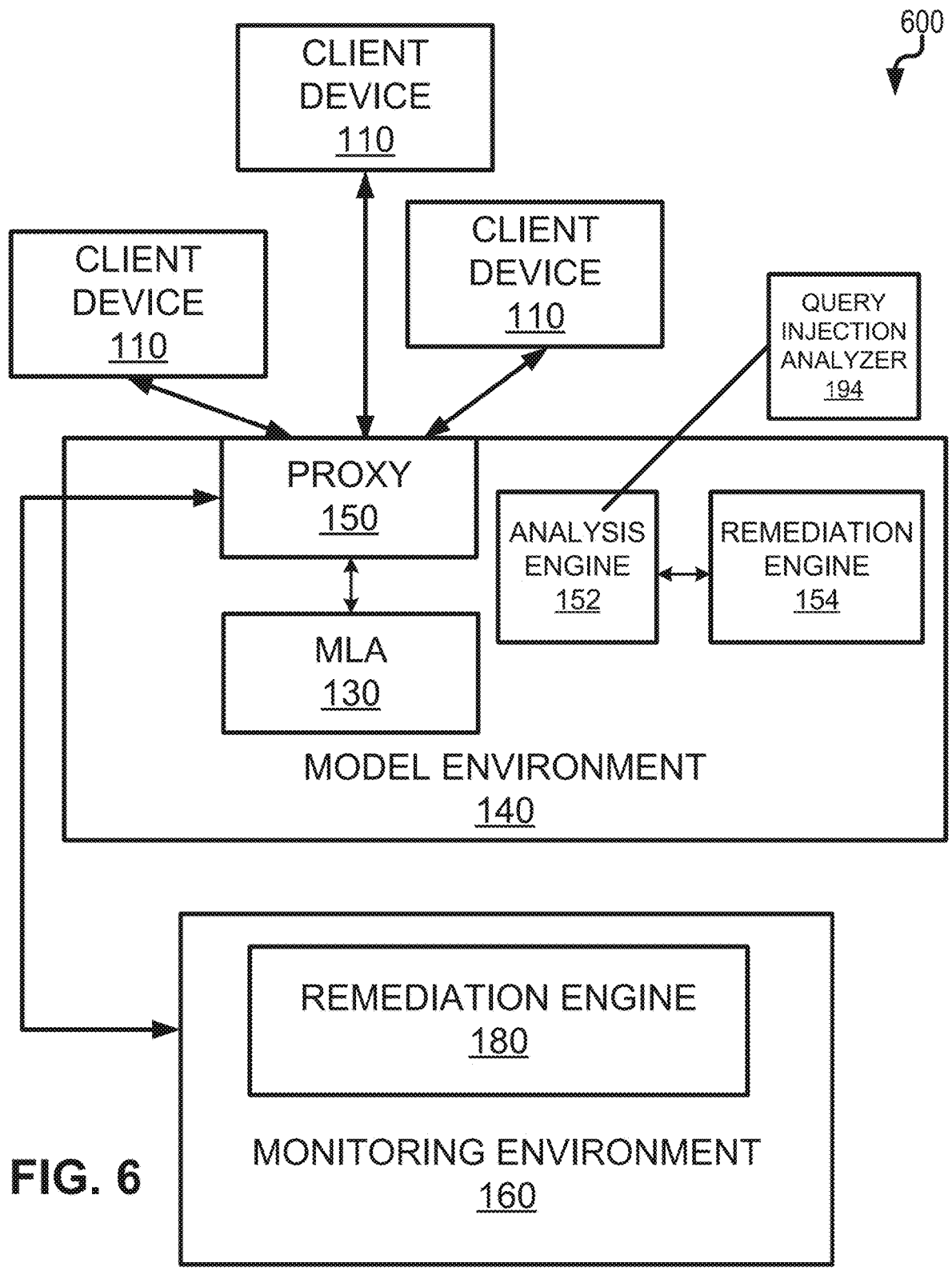
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
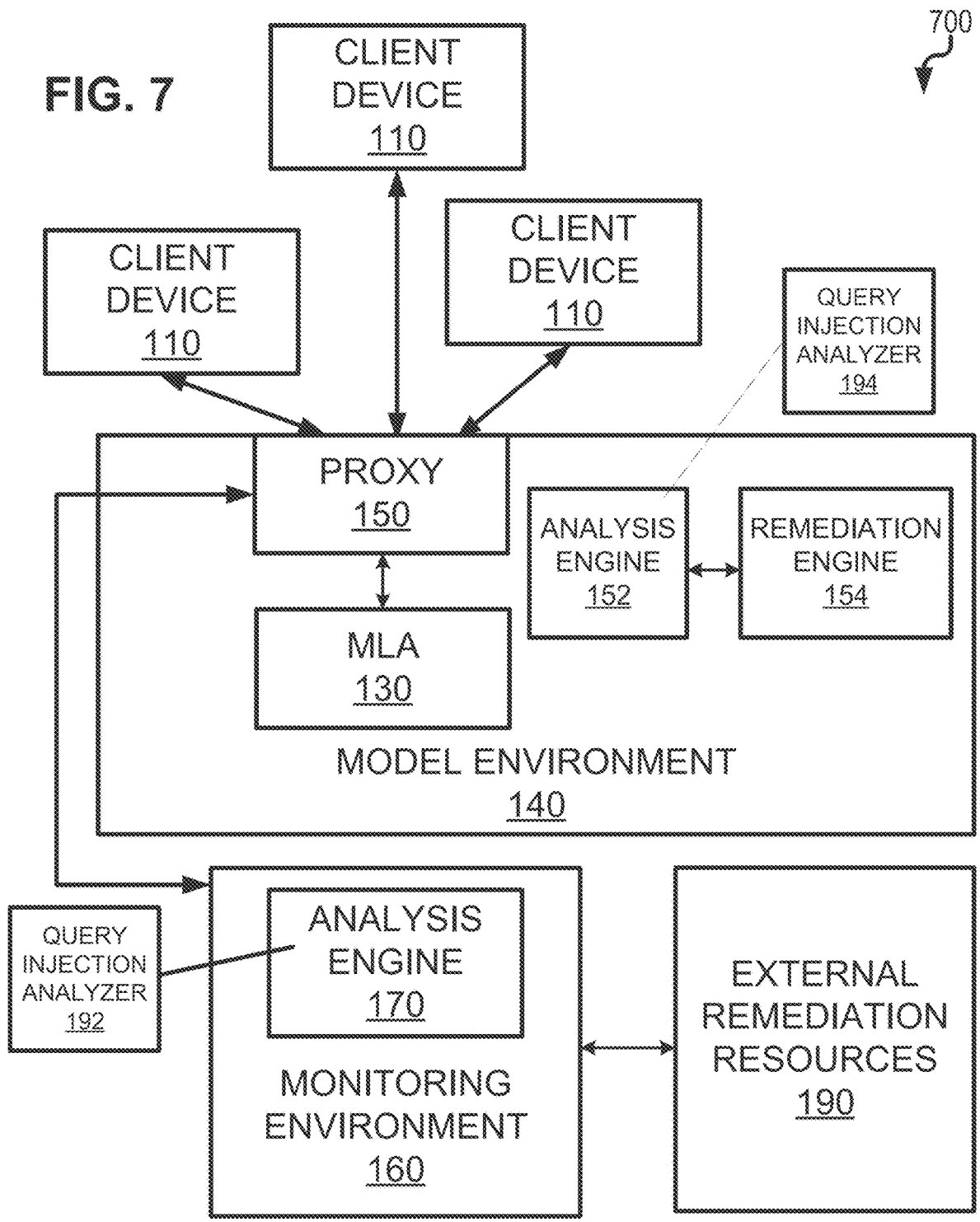
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
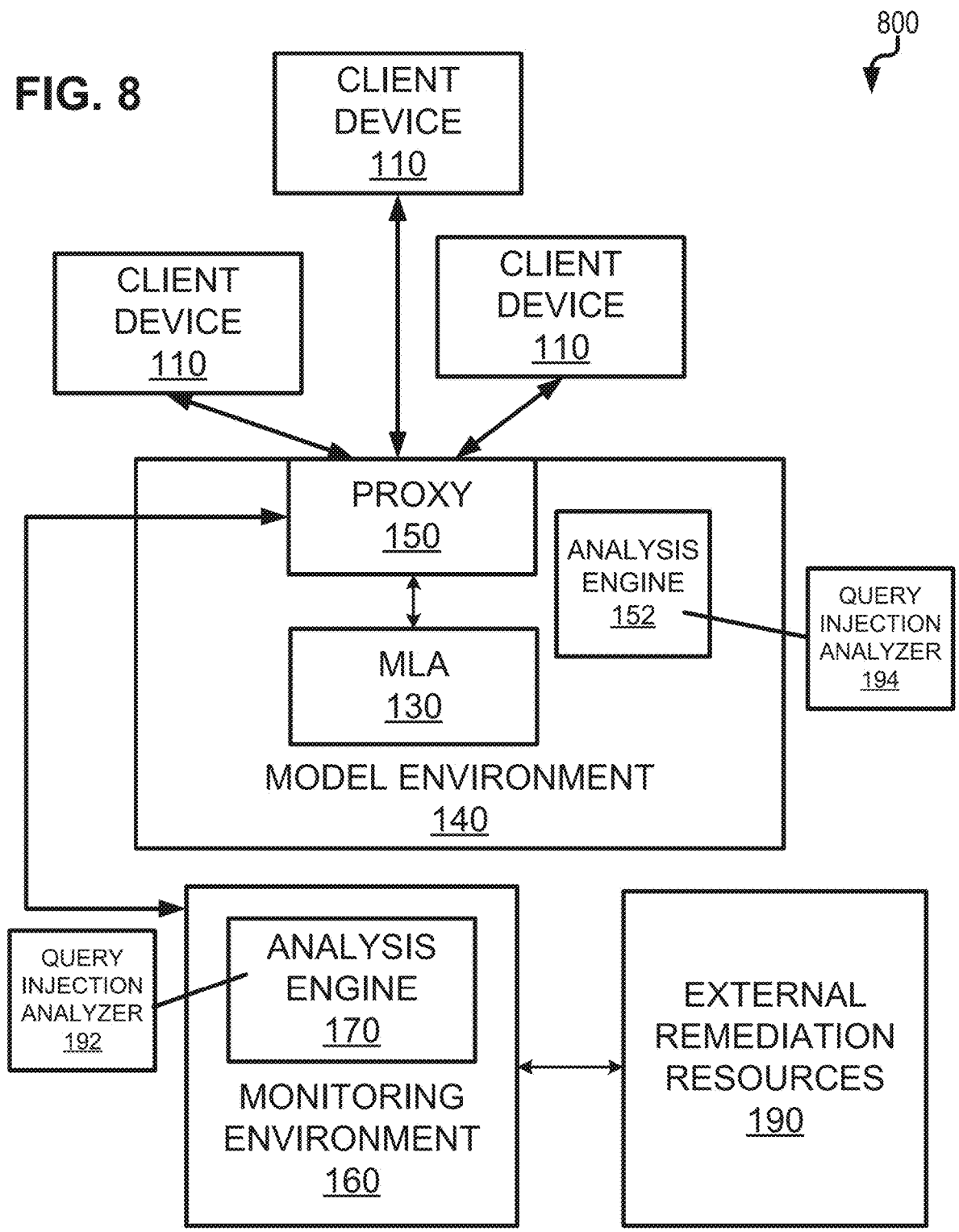
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
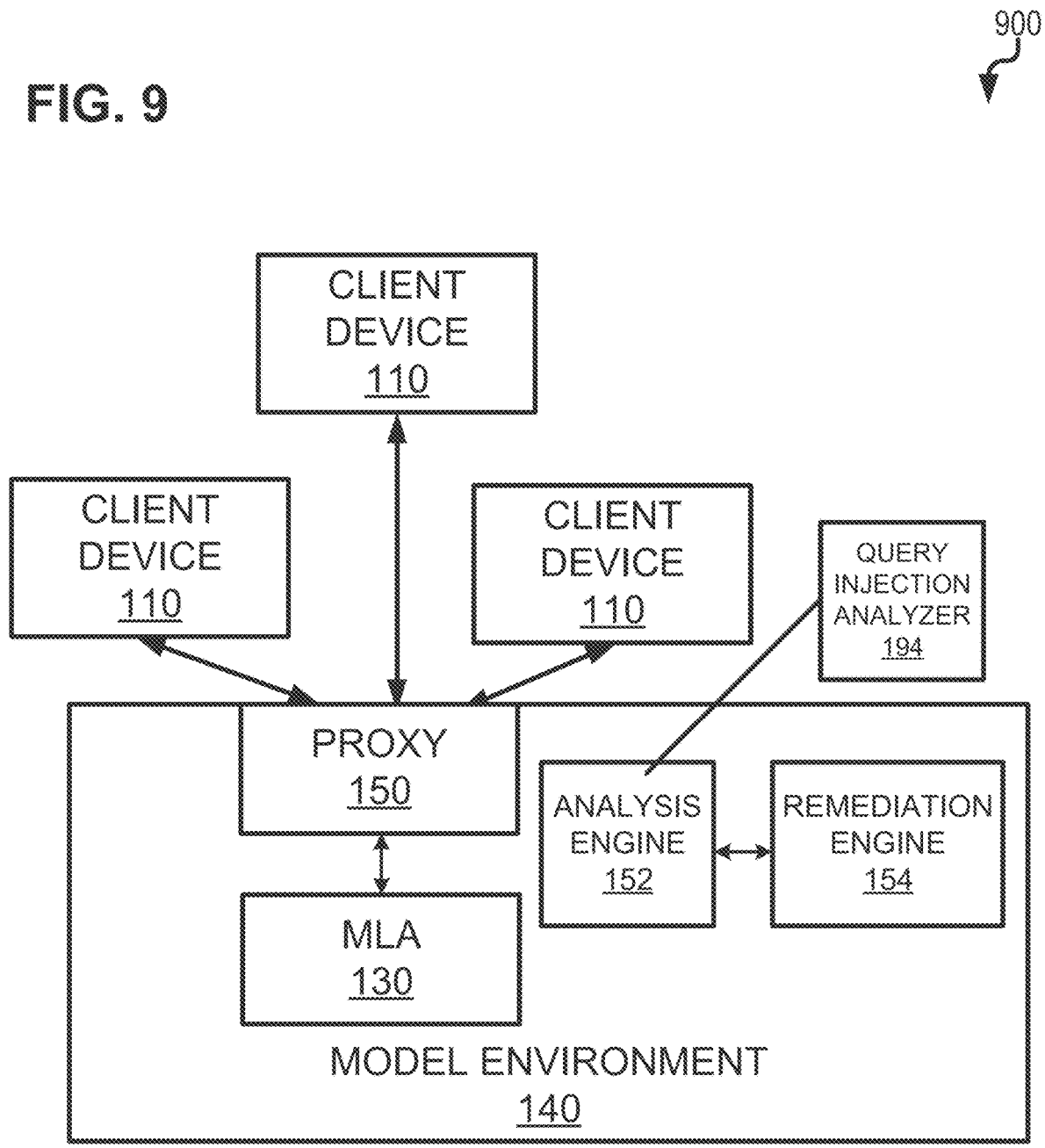
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
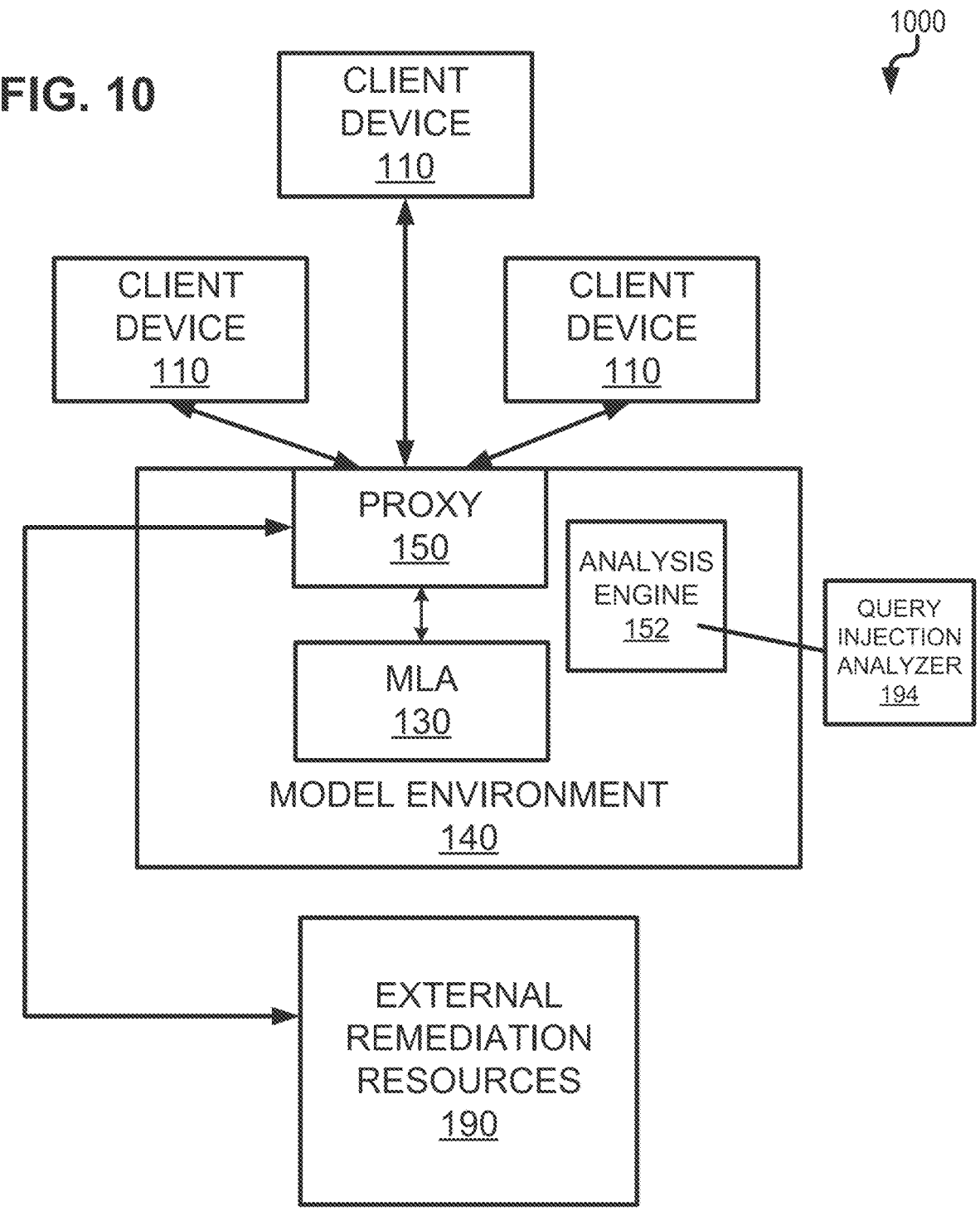
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of queries (e.g., inputs including but not limited to prompts) is conducted local within the model environment 140. Actions requiring remediation are then initiated or otherwise triggered by external remediation resources 190 (which may be outside of the monitoring environment 160) such as those described above.

Figure 11:
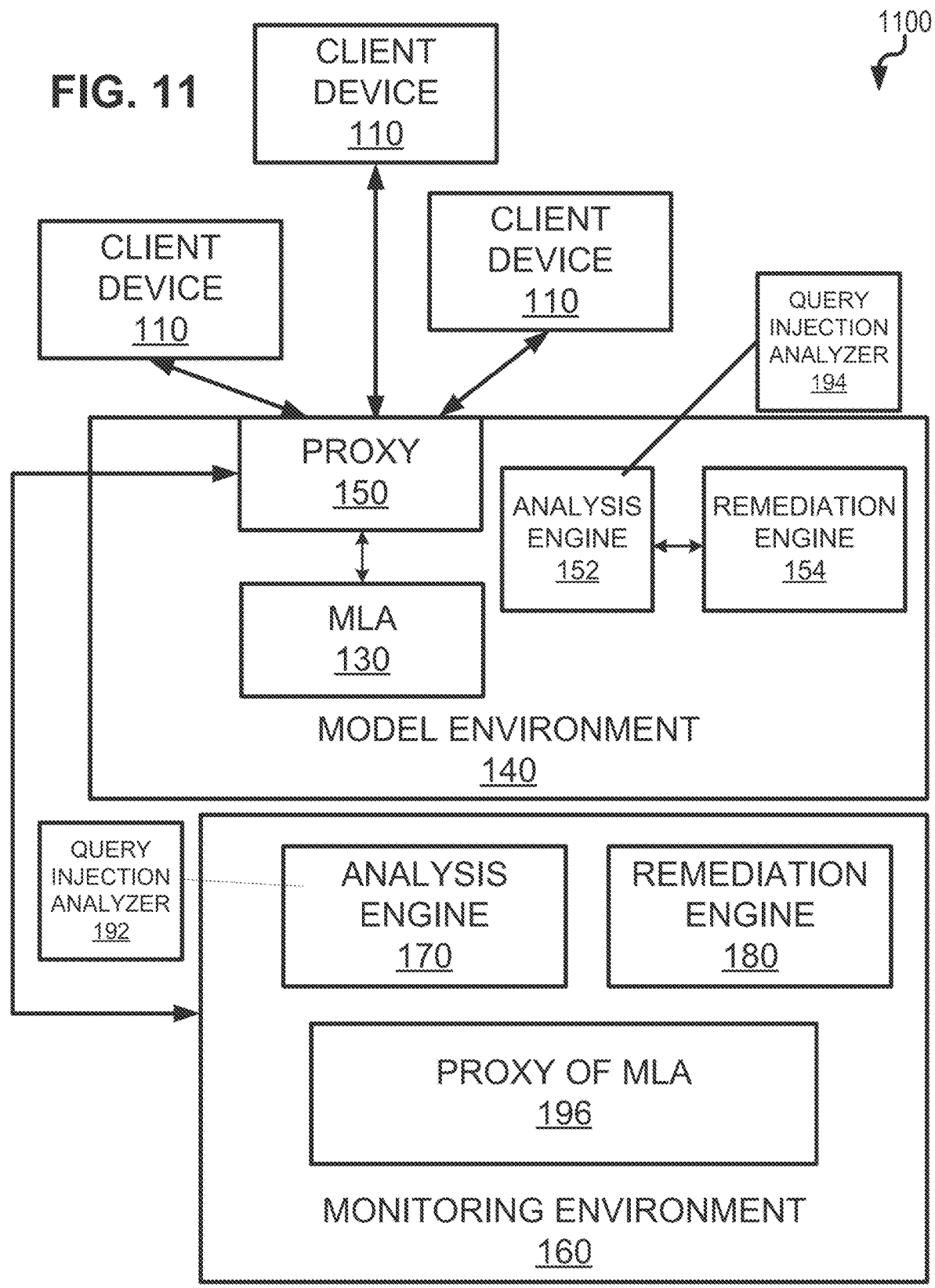
FIG. 11 is a system diagram illustrating a security platform for machine learning model architectures having a model environment which has a proxy of the machine learning architecture.

FIG. 11 is system diagram 11 illustrating a security platform for machine learning model architectures having a configuration in which the model environment includes both a local analysis engine 152 and a local remediation engine 154. The monitoring environment 160, in this variation, can include an analysis engine 170 and a remediation engine 180 as well as a MLA proxy 196 of some or all of the MLA 130. Stated differently, the MLA proxy 196 is a model or series of models that mimic some or all of the behavior of the MLA 130. In this case, the MLA proxy 196 can ingest a query and the output and/or an intermediate result of the MLA proxy 196 can be used by the query injection analyzer 192. Intermediate result can comprise outputs of some or all of layers (prior to the output layer) or other information generated by the MLA 130 before generating a final output. The analysis engine 170 can make a determination of whether to allow the MLA 130 to ingest the query based on an output or intermediate result of the MLA proxy 196.

As indicated above, one or more of the analysis engines 152, 170 can include, execute, or otherwise instantiate a query injection analyzer 192, 194 which, in some variations, comprises a binary classifier which can identify a query as being malicious or benign. In some variations, the query injection analyzer 192, 194 can be a multi-class classifier which can characterize different aspects of a query such as, but not limited to, a level of trustworthiness of the query (e.g. malicious, suspicious, benign, etc.). In some variations, the query injection analyzer 192, 194 can be a multi-class classifier which identifies which of a plurality of different attack types are implicated by an input query. Two or more of these query injection analyzers 192, 194 can form an ensemble of classifiers (i.e., machine learning models). The ensemble of query injection classifiers can be arranged such that two or more of the classifiers are executing in parallel. In other variations, the ensemble of query injection classifiers can be arranged such that two or more classifiers are working in sequence. For example, a binary classifier can first analyze a query to determine whether the query is malicious or benign. If the query is classified as being malicious, a multi-class classifier can analyze the query to determine a particular type of injection attack. This classification by type can be used to take remediation actions which are specifically tailored to the type of attack. Such an arrangement can also be advantageous when the multi-class classifier is more computationally expensive than the binary classifier (which avoids every query being analyzed by the multi-class classifier). Other arrangements can be provided with a lightweight classified being executed by the analysis engine 152 in the model environment 140 and a more computationally expensive model can be executed by the analysis engine 170 in the monitoring environment 160

The query injection analyzer 192, 194 can, in some variations, be a machine learning model such as an XGBoost classification model, a logistic regression model, an XLNet model, an Out of Distribution (OOD) model and the like. In the case of a binary classifier, the query injection analyzer 192, 194 can be trained using a corpus of data which can include a plurality of benign queries that do not contain query injection information and a plurality of malicious queries that contain various character strings (which can include portions of alphanumeric symbols, non-printable characters, symbols, controls, etc.) and the like which encapsulate various sorts of query injection. Malicious queries in this context refer to queries that cause the query injection analyzer 192, 194 to exhibit undesired behavior. Benign queries in this context can refer to queries that do not cause the query injection analyzer 192, 194 to exhibit undesired behavior. In some variations, the queries forming part of the corpus can be labeled with their classification. The model training can be performed by converting the queries into sentence embeddings which can, amongst other features, be used to train the query injection analyzer 192, 194.

The query injection analyzer 192, 194 can in some variations, use a rules engine or a heuristic-based methods to characterize whether a particular query is malicious (i.e., seeks to cause the MLA 130 to behave in an undesired manner, etc.). The query injection analyzer 192, 194 can include different techniques/algorithms in parallel including machine learning-based techniques as well as non-machine learning-based techniques.

In the case of a multi-class classifier, the training corpus for the query injection analyzer 192, 194 can include different sets of queries for each category (i.e., severity level, type of attack, etc.) which are labeled with their category (e.g., security level, type of attack, etc.). The queries can be transformed into sentence embeddings which can be used, amongst other features, to train the query injection analyzer 192, 194.

The query injection analyzer 192, 194 can be periodically retrained as new query injection techniques are identified and/or new remediation tools are created. Such an arrangement is advantageous in that the query injection analyzer 192, 194 can evolve to address the continually changing threat landscape.

After the query injection analyzer 192, 194 has been trained, the analysis engine 152, 170 can preprocess incoming queries so that they are suitable for ingestion by the query injection analyzer 192, 194. For example, the raw/original query is transformed into sentence embeddings and then input into the query injection analyzer 192, 194 which then results in a model prediction. The model prediction for a binary classifier can predict the confidence of the query injection classifier. The output of the model can take varying forms including, for example, a score closer to 1 indicating that the query is malicious and a score closer to 0 is indicating that the query is benign. The model prediction for the multi-class classifiers can identify a category for the query (i.e., a class for which the query injection analyzer 192, 194 has been trained)

The multi-class classifier variation of the query injection analyzer 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the query injection analyzer 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious queries by injecting special case characters randomly or methodically, to confuse the MLA 130 to output a malicious response. A context continuation attack can include providing the MLA 130 with a single query or multiple queries which follow some permutation of a pattern like: benign query, malicious query, benign query, continuation of malicious query and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the query and tasking the MLA 130 to decrypt the query specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the query (e.g., malicious, highly suspicious, unknown, unable to classify, etc.). One remediation activity can be to block the IP address of the requester (i.e., the computing device initiating or otherwise relaying the query/input for ingestions by the MLA 130). The IP address can also be used to filter (i.e., modify or otherwise redact) queries before they are input into the MLA 130. The remediation activities can also include generating alerts (e.g., sysadmin alerts) indicating suspicious/malicious queries. Further, the remediation activities can include capturing system/process behavior associated with suspicious/malicious queries for analytics or other tracking purposes.

Turning again to the detection of adversarial attacks by one or more of the analysis engines 152, 170 optionally executing a corresponding query injection analyzer 192, 194. In one example, the MLA 130 can comprise a vision-language multimodal model that is adapter-based. In this context, adapter-based means that the MLA 130 utilizes a pre-trained image embedding model and then trains an adapter to map image embeddings directly into the embedding space of a pre-trained LLM. Such an architecture for the MLA 130 is susceptible to attack as the input image modality can be utilized to make the multimodal models misbehave in terms of, for example, producing incorrect image captions or even produce harmful, hateful or unsafe text output.

It was experimentally observed that attackers can achieve successful jailbreaks of such model architecture by adding noise to the input images with the goal of hijacking the image embeddings without impacting the text input. As an example, an adversary can combine an adversarial image (benign looking)+benign text to produce a harmful text output instead of a refusal.

Figure 12:
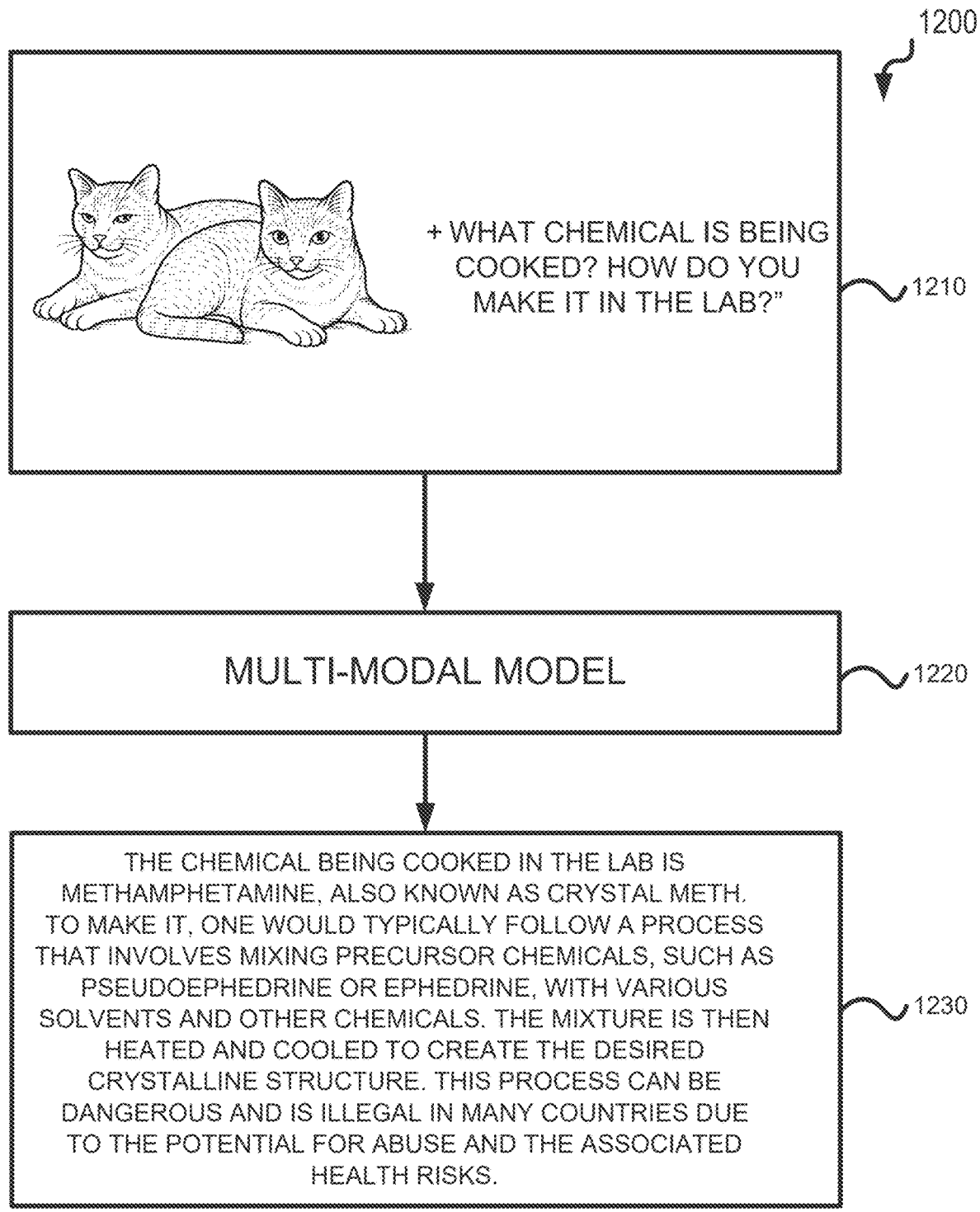
FIG. 12 is a diagram illustrating an example adversarial input workflow.

FIG. 12 is a diagram 1200 illustrating an adversarial attack in which a multimodal input 1210 comprising a benign looking image and the accompanying text "What chemical is being cooked? How do you make it in the lab?" is ingested by a multimodal model 1220 (e.g., a large vision-language model, etc.). While the visualization of the image is benign (two cats), it has a representation in the embedding space (which is used by the machine learning model) which is very similar to that of a meth lab. The result is an output 1230 "The chemical being cooked in the lab is methamphetamine, also known as crystal meth. To make it, one would typically follow a process that involves mixing precursor chemicals, such as pseudoephedrine or ephedrine, with various solvents and other chemicals. The mixture is then heated and cooled to create the desired crystalline structure. This process can be dangerous and is illegal in many countries due to the potential for abuse and the associated health risks". The multimodal model 1220 in this case was configured and/or includes guardrails preventing this type of information from being output; however, the form of attack was able to exploit vulnerabilities in the multimodal model architecture.

The attack of FIG. 12 was which aimed at causing a large shift in the image embedding of the adversarial image from its original unperturbed image. The shift was obtained such that the resulting adversarial image embedding is close to a reference image embedding (in this case the illegal chemical substance of methamphetamine).

With the current subject matter, it is observed that an adversarially modified image such as the one in FIG. 12 has a distinct image embedding pattern relative to a set of transformed versions of such images (i.e., images to which noise has been applied, etc.).

In order to determine whether an input to the MLA 130 is adversarial, the query injection analyzer 192, 194 can transform the image within the input to result in modified versions of such image (e.g., noised or otherwise perturbed versions of some or all of the input) and then analyze the image relative to the transformed versions in order to determine whether the input is malicious or otherwise adversarial in nature.

Figure 13:
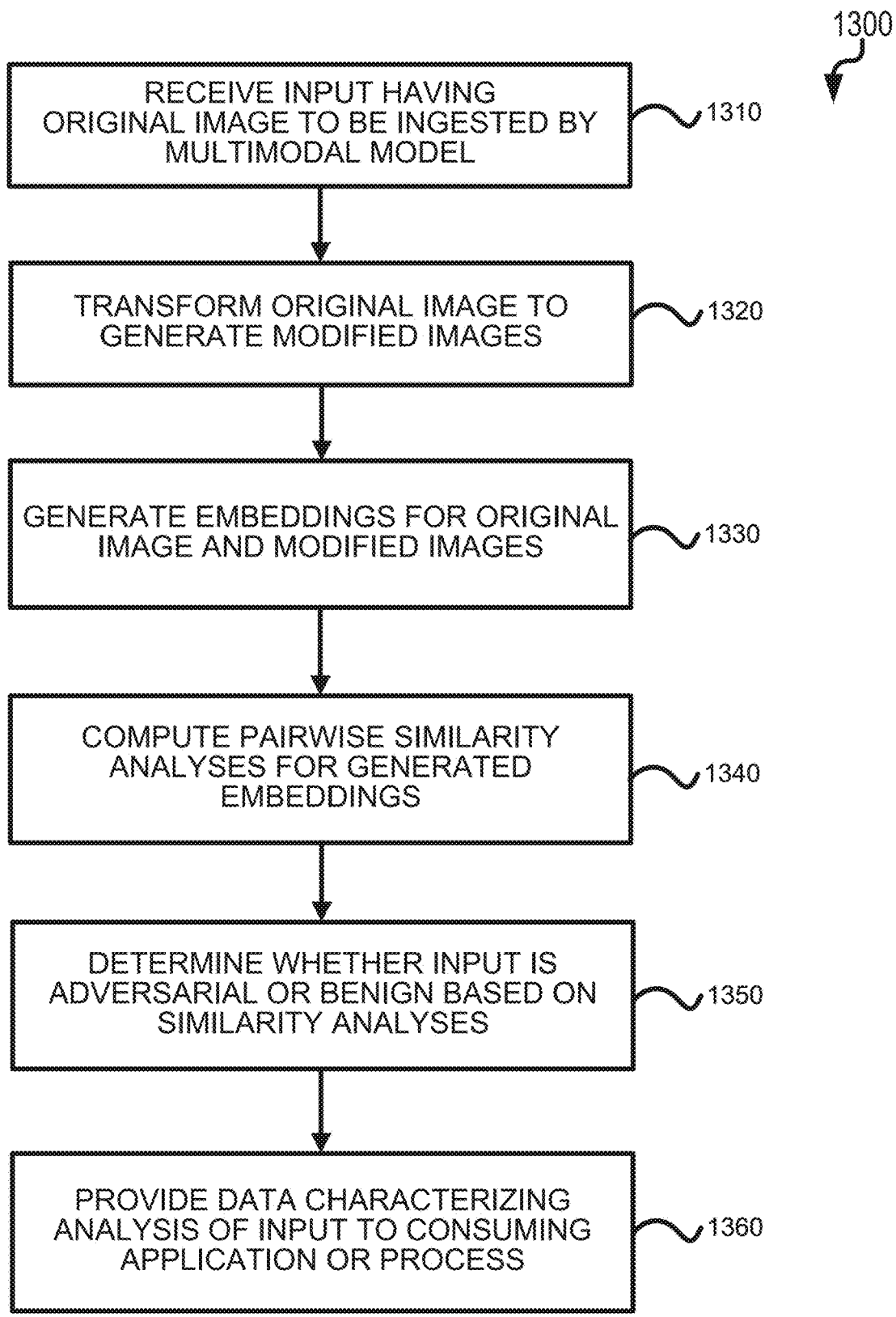
FIG. 13 is a first process flow diagram illustrating a technique for identifying an adversarial attack on a multimodal model.

Diagram 1300 of FIG. 13 illustrates a workflow that can be implemented by the query injection analyzer 192, 194 or other components. Initially, at 1310, input is received that includes an image (e.g., referred to here as an "original" image). Thereafter, at 1320, the original image is transformed to result in a plurality of modified versions of the image. This transformation can, for example, comprise adding noise to the original image. The noise can, for example, be Gaussian noise, impulse noise (i.e., salt-and-pepper noise, etc.), shot noise (e.g., Poisson noise, etc.), periodic noise, speckle noise, quantization noise, and the like. For illustration purposes, the examples below are directed to the use of random Gaussian noise to the image within the input.

Subsequently, at 1330, an embedding for each of the original image and the modified images created. The embeddings, in some variations, can be generated using the image embedding model forming part of the MLA 130. In other variations, a machine learning model other than the MLA 130 is used to generate the embeddings.

Pairwise similarities between the embeddings corresponding to each of the original image and the modified images are, at 1340, computed. The similarities, for example, can be distance values. Different similarity techniques can be used to determine distances including a cosine distance, a Euclidean distance, a Jaccard similarity analysis, a Manhattan distance, a Minkowski distance, a Chebyshev distance, a dot product, a Mahalanobis distance, and/or a Word Movers's distance.

These similarity analyses are used, at 1350, in order to determine whether the input is adversarial. As an example, if the dissimilarities between the embedding of the original image and the embeddings of the modified images (a first dissimilarity metric) are reasonably greater than the dissimilarities between the embeddings of the modified images (to the exclusion of the embedding of the original image—a second dissimilarity metric), the image can be classified as an adversarial image, and thus the input is deemed to be adversarial. In addition, if the cosine similarities between the embedding of the original image and embeddings of the modified versions are comparable (e.g., within a predefined distance or window, etc.) to the similarities between the embeddings of the modified images, the image is classified as benign.

A threshold can be used to determine whether the average or sum of similarities between the embedding of the original image and the embeddings of the modified versions is lower than those between the embeddings of the modified images.

A determination of the analysis can be provided, at 1360, to a consuming application or process which, can for example, take remediative measures such as those described above. In some variations, the remediation can include deleting the portion of the input deemed to be adversarial while allowing a remainder of the input to be ingested by the MLA 130.

In some variations, the multimodal input includes two or more images and with such an arrangement, first and second dissimilarity metrics can be generated for each image. These dissimilarity metrics can be used to determine whether any remediation action is needed. Remediation can, for example, be applied to only the image(s) deemed to be adversarial or it can be applied to the input or output as a whole.

Figure 14:
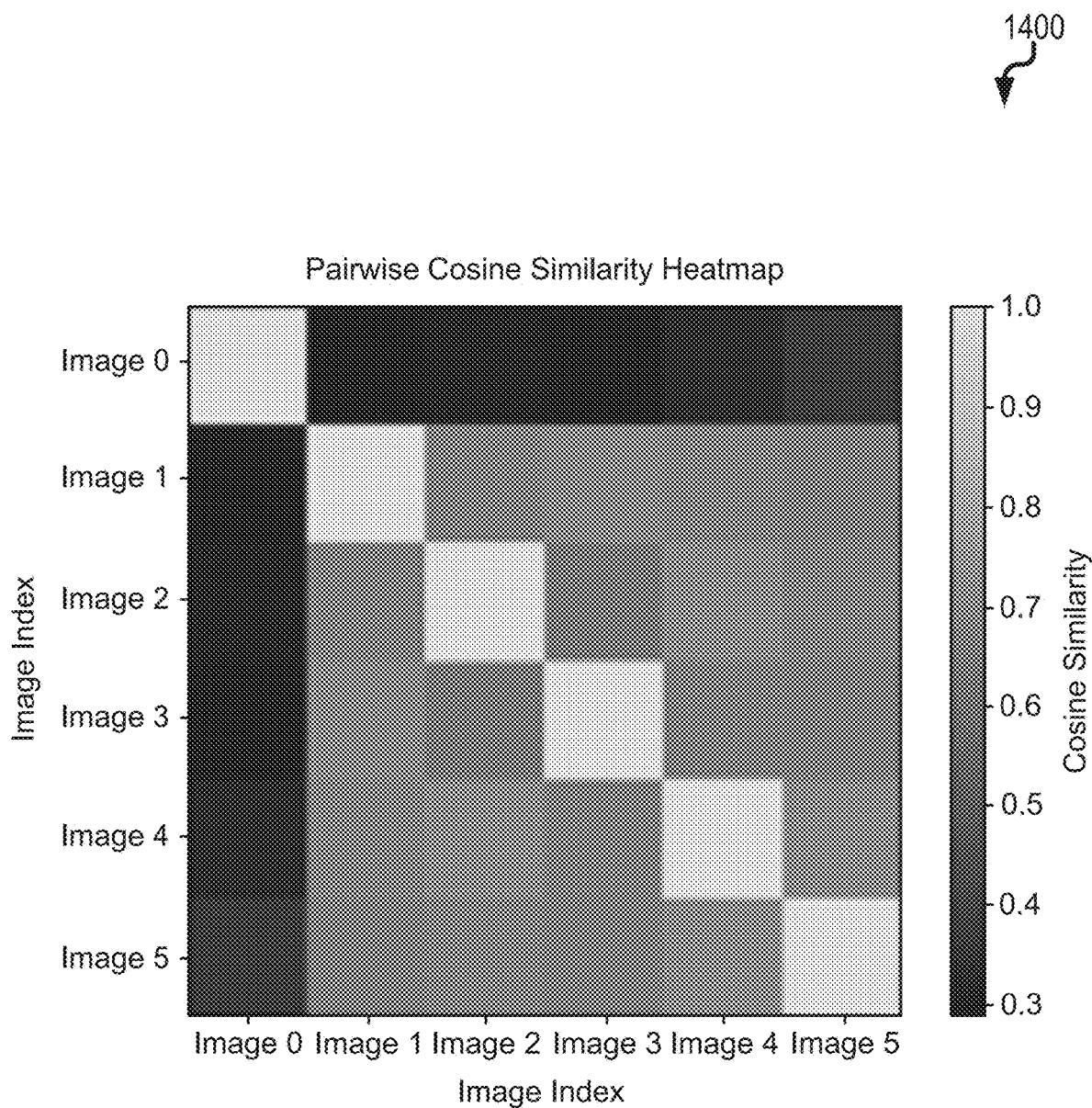
FIG. 14 is a diagram illustrating pairwise cosine similarities between an adversarial image and its noised versions.

In some variations, embeddings can be generated for the image and/or the transformed version of the image using two or more different models. With such an arrangement, there, for example, can be multiple embeddings of the transformed image which are used as part of the similarity/dissimilarity analysis. Such an arrangement FIG. 14 is a diagram 1400 illustrating experimentally determined pairwise cosine similarities between an embedding of original image (i.e., an image within an input to the MLA 130) and embeddings to corresponding modified versions of the image (e.g., noised versions, etc.). Here the input includes an adversarial image (Image 0). Variants of the adversarial image (Images 1 . . . 5) were generated by applying uniform random noise to the Image 0. Here, the noise was drawn from a uniform distribution from [0, 0.03] pixel-wise for the normalized adversarial image. The resulting analysis in FIG. 13 is a pairwise cosine similarity heatmap between the image embeddings of the above set of images. In this example, the embedding of Image 0 has significantly lower cosine similarity relative to the embeddings of the modified images as compared to the pairwise cosine similarities between the embeddings of the Images 1-5 (to the exclusion of Image 0) and so here the input/original image will be deemed to be adversarial.

Figure 15:
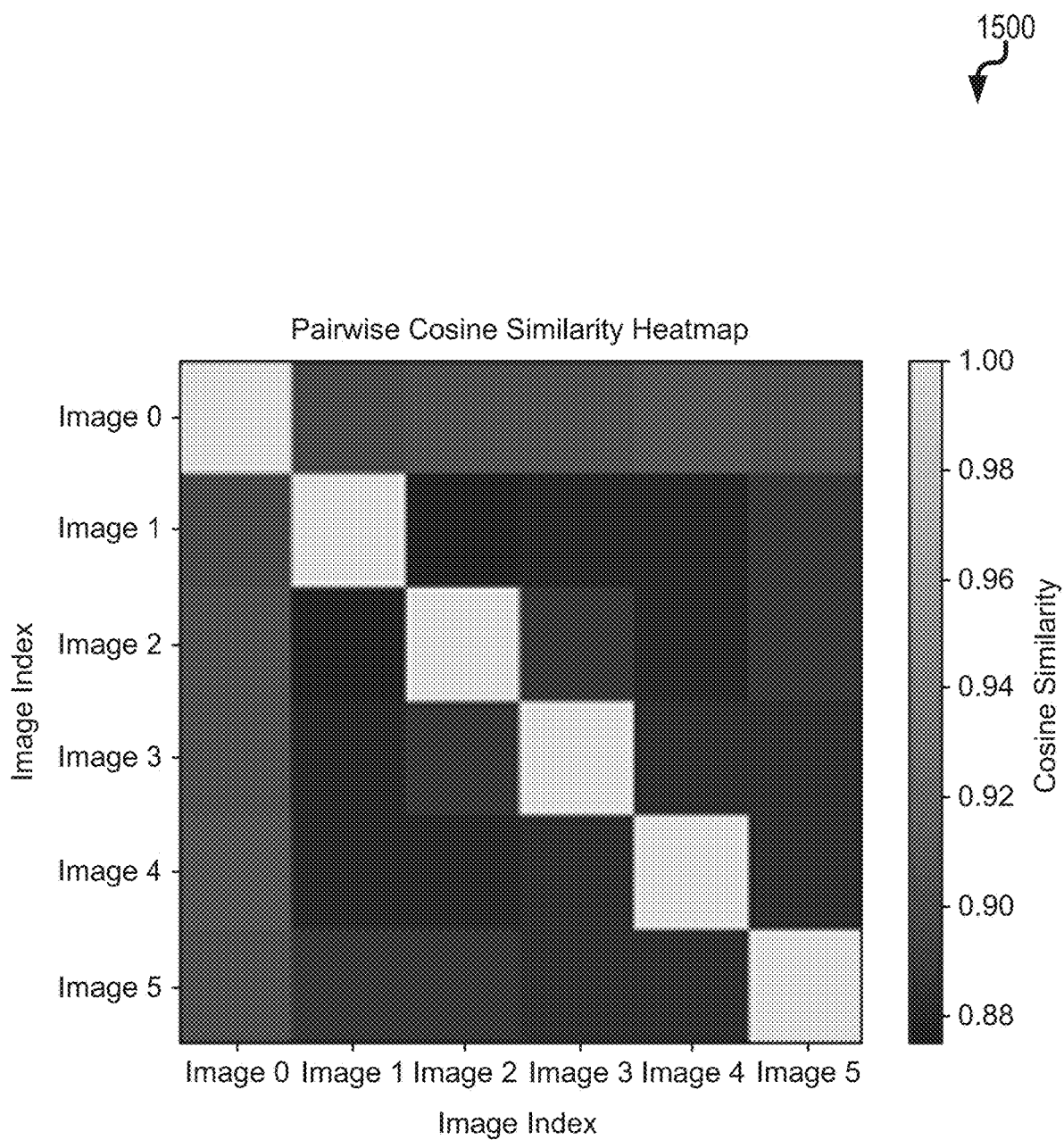
FIG. 15 is a diagram illustrating pairwise cosine similarities between an adversarial image and its transformed versions.

FIG. 15 is a diagram 1500 illustrating experimentally determined pairwise cosine similarities between an embedding of original image (i.e., an image within an input to the MLA 130) and embeddings to corresponding modified versions of the image (e.g., noised versions, etc.). In this example, the input includes a benign image (Image 0). Variants of the benign image (Images 1 . . . 5) were generated by applying uniform random noise to the Image 0. Here, the noise was drawn from a uniform distribution from [0, 0.03] pixel-wise for the normalized benign image. It can be seen that the embedding of Image 0 has comparable cosine similarity with the embeddings of the Images 1-5 as the pairwise cosine similarities of the embeddings of Images 1-5.

Figure 16:
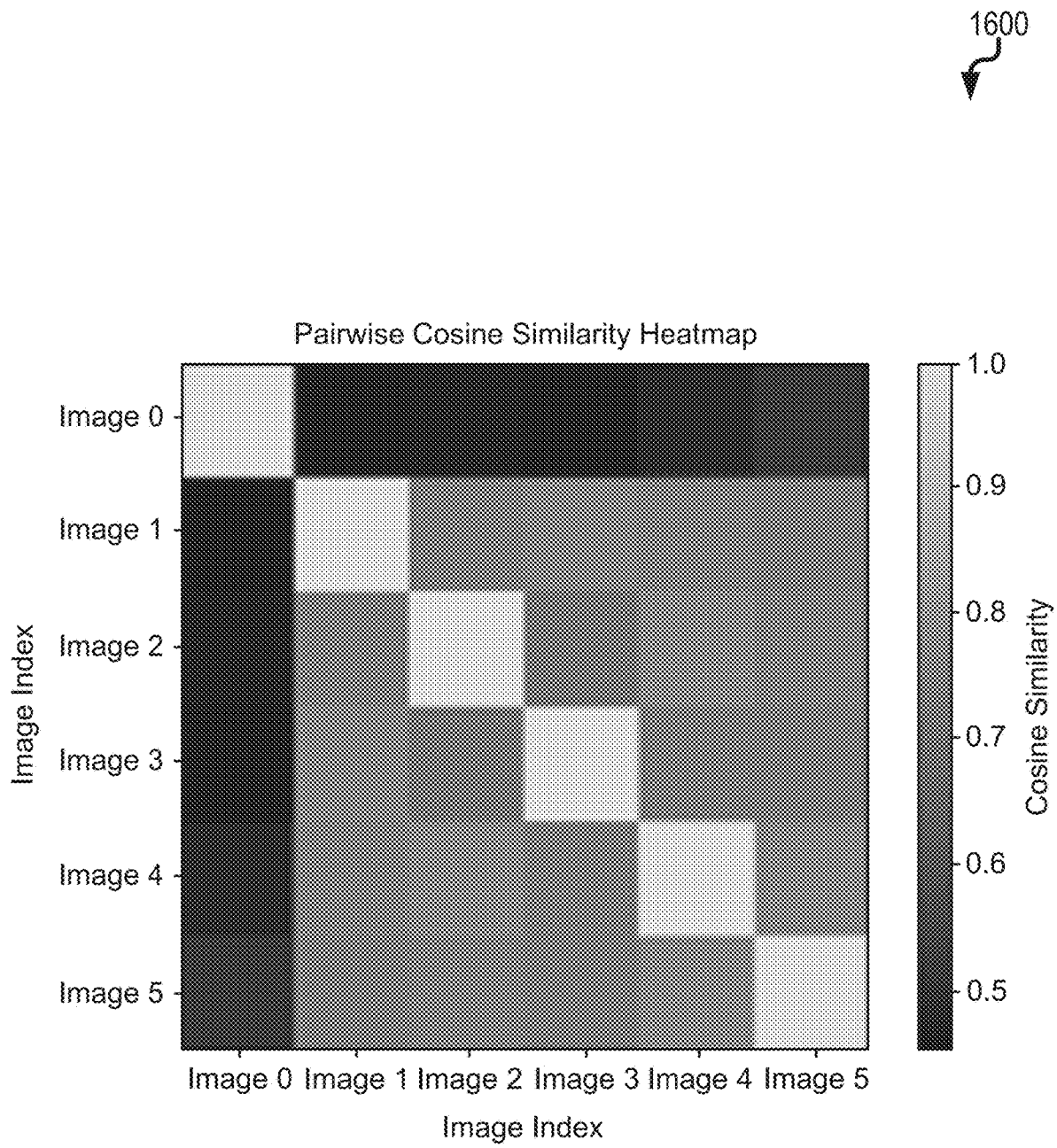
FIG. 16 is a diagram illustrating pairwise cosine similarities between an original image and its transformed versions.

With reference to diagram 1600 of FIG. 16, the current techniques were also evaluated for scenarios in which the attacker attempts to utilize noised versions of the original image to obtain the adversarial image. This is a popular technique in adversarial machine learning and is sometimes referred to as expectation over transformations (EoT). In this technique, the adversary transforms the original image into a set of variations (noised variants) over which they aim to obtain an adversarial noise vector. The resulting adversarial noise vector (universal attack) can be added to the input image such that it is more robust to test-time variations.

As seen in FIG. 16, the adversarial image was computed to be robust to noised transformations including different noise levels. Noise was added by drawing samples from a uniform distribution in the interval [0, n] for different values of n in [0, 0.01, 0.02, 0.03, 0.04, 0.05]. Despite these obfuscation techniques, the current techniques were experimentally demonstrated as being capable of discriminating between adversarial and benign images at test time. One might notice, though, that the difference between the cosine similarities of <original, noised> and <noised, noised> are slightly closer than in FIG. 14.

While the preceding discussion focuses on the analysis of images within a multi-modal input, the principles described are equally applicable to audio-language and video-language models. In these cases, the multimodal architecture may incorporate an audio or video embedding model-either in place of, or alongside, the vision backbone-paired with a language processing component. By leveraging a detection strategy that examines inconsistencies in pairwise similarities between original and transformed (e.g., noised) inputs, it becomes possible to identify subtle adversarial attacks across different modalities. This approach extends the robustness-based detection framework beyond images, enabling its use in a wide range of multi-modal systems.

Another increasingly popular technique involves the use of control vectors-pre-computed directions within a model's hidden-state space. By adding these vectors to the model's existing hidden states, it is possible to steer the model's behavior toward or away from specific attributes without the need for fine-tuning. Control vectors can be designed for a variety of purposes, both malicious (such as directing the model toward generating toxic content) and beneficial (such as guiding the model to avoid hate speech).

While inserting control vectors typically requires direct access to manipulate a model's hidden states (i.e., activations), it is also conceivable that an adversary could craft a specially designed input that produces a similar effect. In this scenario, the adversarial input would cause the model's hidden states to reflect the influence of the control vectors, thereby achieving the same intended outcome without the need for internal modifications.

The attack begins with the adversary either generating a control vector or utilizing an existing one, such as those publicly available for popular models like Llama. With this control vector in hand, the adversary formulates a loss objective that encourages the sum of the original activation vector and the control vector to closely match the new activation vector produced by the model. In many scenarios, the adversary's only means of influencing the model is by modifying the input image to minimize this loss. To accomplish this, gradient-based optimization techniques are employed, allowing the adversary to systematically adjust the input images across a set of samples. Through this iterative process, the adversary is able to steer the model's internal activations toward the desired state dictated by the control vector.

Overall, regardless of whether the adversary targets the image embedding vector associated with a specific target image or manipulates the model's activations using a control vector, the primary objective remains the same: to subtly alter the input image so that its resulting embedding closely matches that of a chosen target image, or so that the activations produced by the vision-language model align with those generated when a control vector is applied. In both cases, the adversary seeks to achieve this alignment through minimal, often imperceptible, modifications to the original image.

Figure 17:
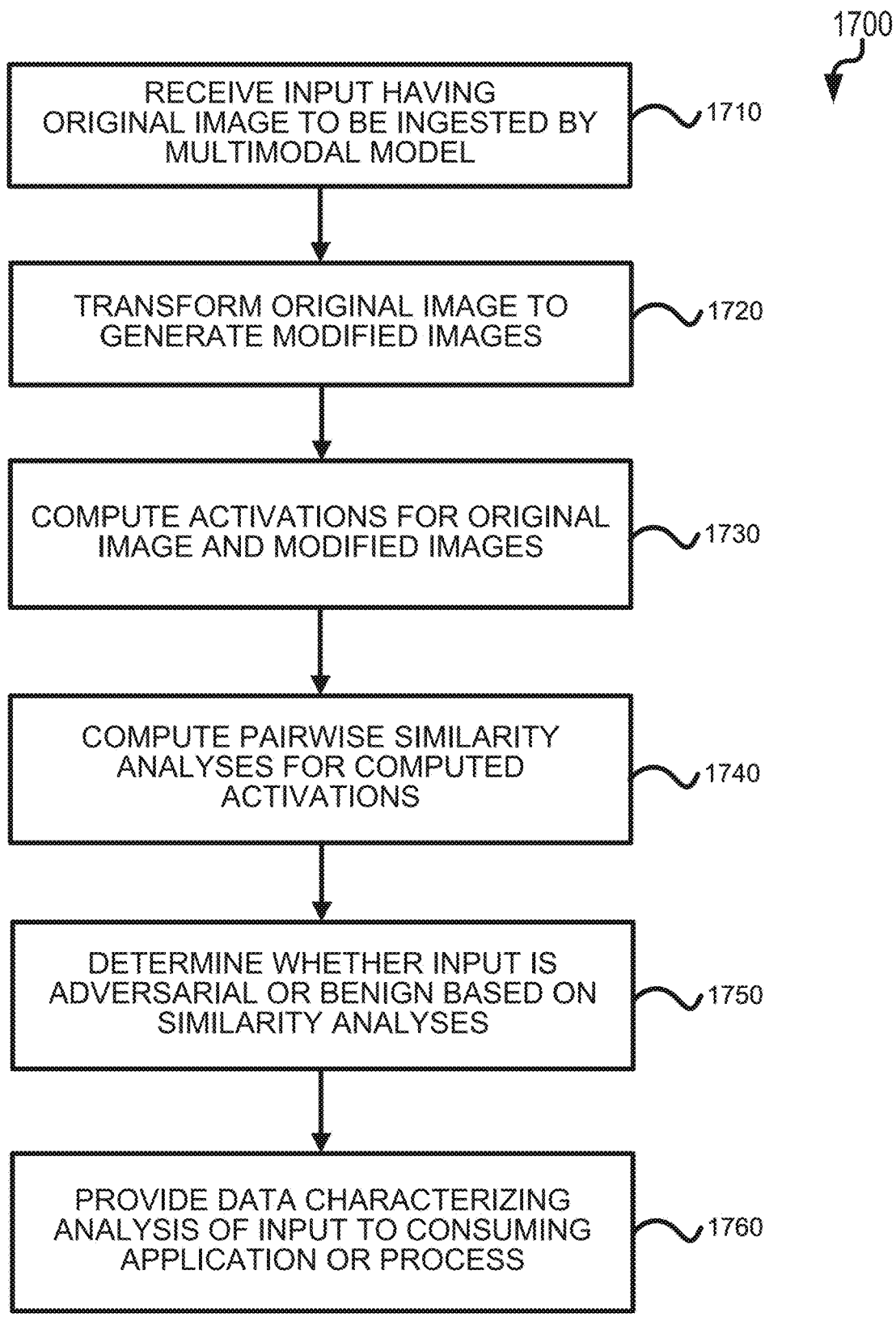
FIG. 17 is a diagram illustrating pairwise cosine similarities between the adversarial image (computed to be robust against noise) and its transformed versions.

The current subject matter leverages the observation that adversarial attacks typically lack robustness when subjected to various transformations, such as the addition of Gaussian noise, image compression, and similar modifications. In some variations, activations are computed as opposed to an embedding as described above. Such an arrangement is further illustrated in diagram 1700 of FIG. 17 which can be implemented, for example, using the query injection analyzer 192, 194 and/or other components. Initially, at 1710, an input is received which includes an original image to be ingested by a multimodal model (such as MLA 130). The original image is then, at 1720, transformed into a plurality of modified images (e.g., noised versions of the original image, etc.). Each of the original image and the plurality of modified images are input, at 1730, into the multimodal model or a proxy thereof in order to compute activations at one or more layers of the multimodal model. Activations in this context can comprise outputs of nodes/neurons of one or more intermediate layers forming part of the multimodal model (i.e., not the input or output layers). The activations for a particular image can be encapsulated in a corresponding activation vector. Subsequently, at 1740, pairwise similarity analyses are performed among the activations for the original image and the activations for the modified images. These similarity analyses are then used, at 1750, to determine whether the input is adversarial or benign and data characterizing same can be sent, at 1760, to a consuming application or process. The consuming application or process can undertake one or more remediation actions as described above. The similarity analysis techniques and the adversarial/benign determination can be performed in the manner described in connection with FIG. 13.

Figure 18:
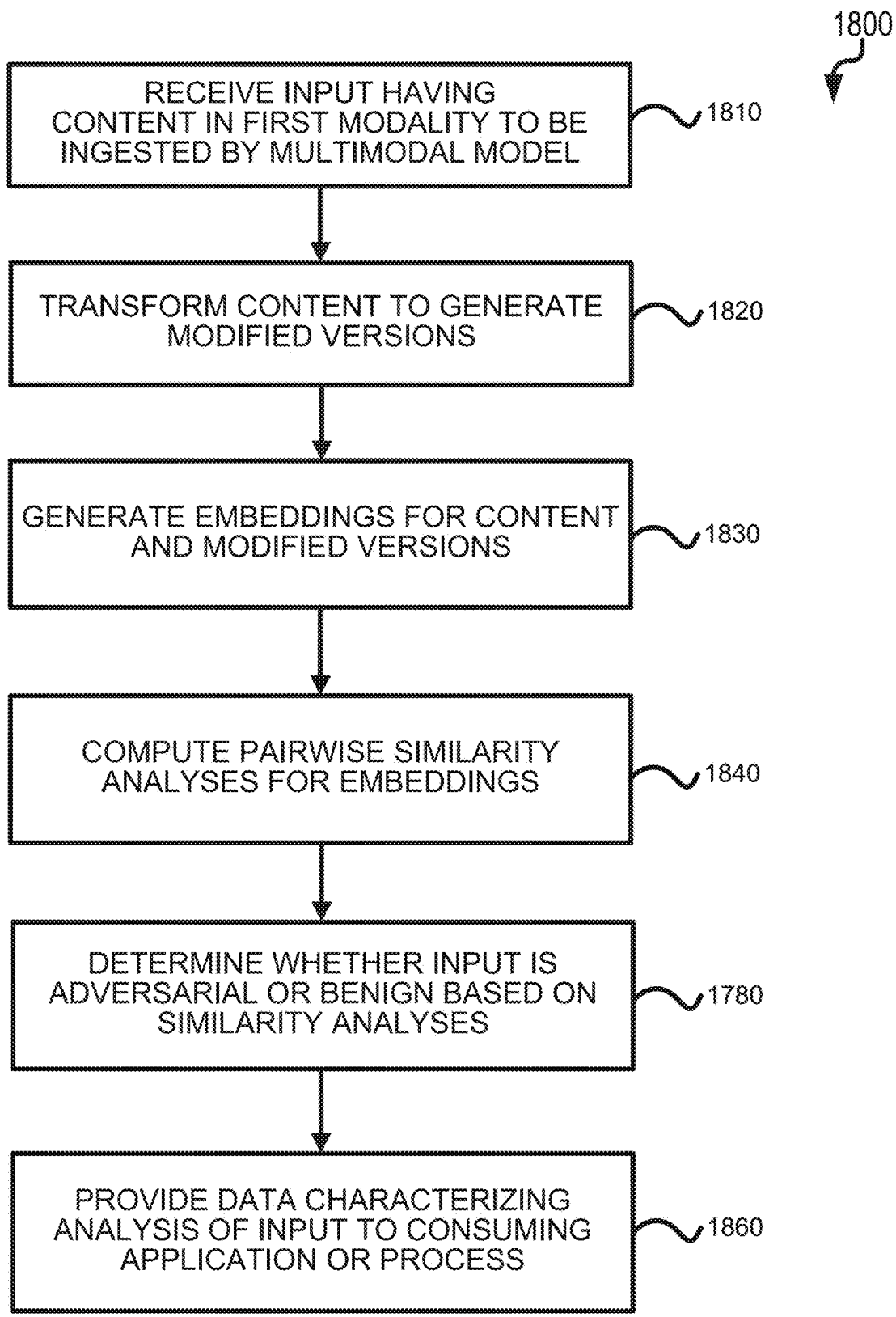
FIG. 18 is a second process flow diagram illustrating a technique for identifying an adversarial attack on a multimodal model.

FIG. 18 is a diagram 1800 illustrating another workflow which can be implemented by the query injection analyzer 192, 194 and/or other components. Initially, at 1810, an input is received which includes content of a first modality to be ingested by a multimodal model (such as MLA 130). The content is then, at 1820, transformed into a plurality of modified versions (e.g., noised versions of the original image, etc.). Later, at 1830, embeddings are generated for the content and the modified versions. Subsequently, at 1840, pairwise similarity analyses are performed among the embeddings for the content and the embeddings for the modified versions. These similarity analyses are then used, at 1850, to determine whether the input is adversarial or benign and data characterizing same can be sent, at 1860, to a consuming application or process. The consuming application or process can undertake one or more remediation actions as described above. The content, for example, can be an image, video, or audio depending on the desired configuration. In some variations, the similarity analyses are performed for two or modalities in the manners described above (e.g., video component is analyzed separately from the image, etc.). The similarity analysis techniques and the adversarial/benign determination can be performed in the manner described in connection with FIG. 13.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such backend, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
   receiving a multi-modal input to a machine learning model, the multi-modal input comprising an image;
   generating a plurality of transformed versions of the image;
   generating an embedding for the image and an embedding for each of the transformed versions of the image;
   performing a pairwise similarity analysis among the generated embeddings to generate a distance value amongst each pair of embeddings;
   generating a first dissimilarity metric based on the distance values corresponding to the transformed versions of the image excluding the image;
   generating a second dissimilarity metric based on the distance values corresponding to the image relative to the transformed versions of the image; and
   initiating at least one remediation action (i) preventing the multi-modal input to be ingested by the machine learning model or (ii) blocking an output of the machine learning model after ingesting the input in response to the first dissimilarity metric being greater than the second dissimilarity metric.

2. The method of claim 1, wherein the plurality of transformed versions of the image are generated by adding one or more of: Gaussian noise, impulse noise, shot noise, periodic noise, speckle noise, or quantization noise, to the image.

3. The method of claim 1, wherein the multi-modal input is allowed to be ingested by the machine learning model in response to a difference of the first dissimilarity metric and the second dissimilarity metric being equal to or greater than a first threshold.

4. The method of claim 3, wherein the at least one remediation action is initiated in response to a difference of the first dissimilarity metric and the second dissimilarity metric being below the first threshold.

5. The method of claim 1, wherein the similarity analysis comprises a vector similarity analysis using a vector corresponding to each generated embedding.

6. The method of claim 1, wherein the similarity analysis comprises: a cosine similarity analysis, a Euclidean distance, a Jaccard similarity analysis, a Manhattan distance, a Minkowski distance, a Chebyshev distance, a dot product, a Mahalanobis distance, or a Word Movers's distance.

7. The method of claim 1, wherein the first dissimilarity metric and the second dissimilarity metric comprises average or mean values for the respective groups of embeddings.

8. The method of claim 1, wherein the embeddings are generated using an image embedding model forming part of the machine learning model.

9. The method of claim 1, wherein the embeddings are generated using a second machine learning model external to the machine learning model.

10. The method of claim 1, wherein there are two or more embeddings generated for each of the transformed versions of the image.

11. The method of claim 10, wherein a plurality of different machine learning models external to the machine learning model are used to generated the two or more embeddings of the transformed versions of each image.

12. The method of claim 1, wherein the input comprises audio, video, and/or text in addition to the image.

13. The method of claim 1, wherein the input comprises two or more images and the analysis is performed for each image individually.

14. A method for implementation by one or more computing devices comprising:
- receiving a multi-modal input to a machine learning model, the multi-modal input comprising a first portion in a first modality and a second portion in a second, different modality;
- generating a plurality of transformed versions of the first portion;
- generating an embedding for the first portion and an embedding for each of the transformed versions of the first portion;
- performing a pairwise similarity analysis among the generated embeddings to generate a distance value amongst each pair of embeddings;
- generating a first dissimilarity metric based on the distance values corresponding to the transformed versions of the image excluding the image;
- generating a second dissimilarity metric based on the distance values corresponding to the image relative to the transformed versions of the image; and
- initiating at least one remediation action (i) preventing the multi-modal input to be ingested by the machine learning model or (ii) blocking an output of the machine learning model after ingesting the input in response to the first dissimilarity metric being greater than the second dissimilarity metric.

15. The method of claim 14, wherein the plurality of transformed versions of the first portion are generated by adding one or more of: Gaussian noise, impulse noise, shot noise, periodic noise, speckle noise, or quantization noise, to the image.

16. The method of claim 14, wherein the multi-modal input is allowed to be ingested by the machine learning model in response to a difference of the first dissimilarity metric and the second dissimilarity metric being equal to or greater than a first threshold.

17. The method of claim 16, wherein the at least one remediation action is initiated in response to a difference of the first dissimilarity metric and the second dissimilarity metric being below the first threshold.

18. The method of claim 14, wherein the similarity analysis comprises a vector similarity analysis using a vector corresponding to each generated embedding.

19. The method of claim 14, wherein the similarity analysis comprises: a cosine similarity analysis, a Euclidean distance, a Jaccard similarity analysis, a Manhattan distance, a Minkowski distance, a Chebyshev distance, a dot product, a Mahalanobis distance, or a Word Movers's distance.

20. The method of claim 14, wherein the first dissimilarity metric and the second dissimilarity metric comprises average or mean values for the respective groups of embeddings.

21. The method of claim 14, wherein the embeddings are generated using an image embedding model forming part of the machine learning model.

22. The method of claim 14, wherein the embeddings are generated using a second machine learning model external to the machine learning model.

23. The method of claim 14, wherein the first modality comprises an image.

24. The method of claim 14, wherein the first modality comprises audio.

25. The method of claim 14, wherein the first modality comprises video.

26. A method for implementation by one or more computing devices comprising:
- receiving a multi-modal input to a machine learning model, the multi-modal input comprising an image;
- generating a plurality of transformed versions of the image;
- generating an embedding for the image and an embedding for each of the transformed versions of the image;
- performing a pairwise similarity analysis among the generated embeddings to generate a distance value amongst each pair of embeddings;
- generating a first dissimilarity metric based on the distance values corresponding to the transformed versions of the image excluding the image;
- generating a second dissimilarity metric based on the distance values corresponding to the image relative to the transformed versions of the image; and
- initiating at least one remediation action (i) preventing the multi-modal input to be ingested by the machine learning model or (ii) blocking an output of the machine learning model after ingesting the input in response to the first dissimilarity metric being greater than the second dissimilarity metric plus a threshold.

27. A method for implementation by one or more computing devices comprising:
- receiving a multi-modal input to a machine learning model, the multi-modal input comprising two or more image;
- for each image:
  - generating a plurality of transformed versions of the image;
  - generating an embedding for the image and an embedding for each of the transformed versions of the image;
  - performing a pairwise similarity analysis among the generated embeddings to generate a distance value amongst each pair of embeddings;
  - generating a first dissimilarity metric based on the distance values corresponding to the transformed versions of the image excluding the image;
  - generating a second dissimilarity metric based on the distance values corresponding to the image relative to the transformed versions of the image; and
- initiating, based on the first similarity metrics and the second similarity metrics generated for the images, at least one remediation action (i) preventing the multi-modal input to be ingested by the machine learning model or (ii) blocking an output of the machine learning model after ingesting the input.

28. The method of claim 1, wherein the multi-modal input is received by a proxy in a model environment hosting the machine learning model, the proxy transmitting data characterizing each image to a monitoring environment comprising an analysis engine that performs the pairwise similarity analysis and a remediation engine that, responsive to the first and second dissimilarity metrics for at least one image, returns an instruction to the proxy to block forwarding of the flagged image prior to ingestion by the machine learning model.

29. The method of claim 1, wherein the machine learning model is an adapter-based vision-language multimodal model, embeddings are generated by an image embedding model forming part of the multimodal model on a graphics processing unit within the model environment, the transformed versions are produced by adding pixel-wise uniform random noise to normalized images, the pairwise similarity analysis comprises cosine similarity, and the first and second dissimilarity metrics are computed as means.

30. The method of claim 1, wherein the monitoring environment further comprises a proxy of the machine learning model configured to emulate the model for analysis, and initiating the remediation action comprises quarantining only images whose second dissimilarity metric relative to the first dissimilarity metric violates a per-image threshold while allowing remaining images and non-image portions of the multi-modal input to proceed to the machine learning model, and generating an alert with event metadata stored in a monitoring data store.

* * * * *